US010792816B2

(12) United States Patent
Pringle, IV et al.

(10) Patent No.: US 10,792,816 B2
(45) Date of Patent: Oct. 6, 2020

(54) PORTABLE PROGRAMMABLE MACHINES, ROBOTIC END EFFECTORS, AND RELATED METHODS

(71) Applicant: The Boeing Company, Chicago, IL (US)

(72) Inventors: John Walter Pringle, IV, Gardena, CA (US); Chris J. Erickson, Garden Grove, CA (US)

(73) Assignee: The Boeing Company, Chicago, IL (US)

(*) Notice: Subject to any disclaimer, the term of this patent is extended or adjusted under 35 U.S.C. 154(b) by 146 days.

(21) Appl. No.: 15/832,543

(22) Filed: Dec. 5, 2017

(65) Prior Publication Data

US 2019/0168388 A1  Jun. 6, 2019

(51) Int. Cl.
*B25J 5/00* (2006.01)
*B25J 9/16* (2006.01)
(Continued)

(52) U.S. Cl.
CPC .......... *B25J 9/1687* (2013.01); *B25J 5/007* (2013.01); *B25J 9/0036* (2013.01); *B25J 9/1697* (2013.01);
(Continued)

(58) Field of Classification Search
CPC .... B25J 9/0036; B25J 9/1697; B25J 11/0075; B25J 11/0085; B25J 11/005; B64F 5/00;
(Continued)

(56) References Cited

U.S. PATENT DOCUMENTS 3,760,956 A * 9/1973 Burch ................. B25J 5/02
414/744.3
5,672,044 A * 9/1997 Lemelson .......... B66C 23/00
414/744.3
(Continued)

FOREIGN PATENT DOCUMENTS

WO  WO 2009/140547  11/2009

OTHER PUBLICATIONS

European Patent Office, Extended European Search Report for related European Application No. 18205028, dated Apr. 18, 2019.
U.S. Appl. No. 15/143,033, filed Apr. 29, 2016, Erickson.

*Primary Examiner* — Jason L Vaughan
*Assistant Examiner* — Amanda Kreiling
(74) *Attorney, Agent, or Firm* — DASCENZO Intellectual Property Law, P.C.

(57) ABSTRACT

A portable work module includes a combination of prismatic and revolute joints for positioning and orienting a robotic end effector for performing a task within confined space. For example, the portable work module may include telescoping arm integrated with wrist having a plurality of degrees of freedom with respect to telescoping arm. The portable work module includes an insert that is secured with respect to an access port of confined space, said access port serving as a reference location for calculating the position of the robotic end effector within confined space. The portable work module is configured to have a compacted configuration for insertion into confined space, and an extended configuration for performing tasks within confined space. In some examples, the portable work module is modular, such that the robotic end effector or other components may be selectively removed and replaced.

21 Claims, 26 Drawing Sheets

(51) Int. Cl.
*B25J 11/00* (2006.01)
*B25J 17/02* (2006.01)
*B25J 18/02* (2006.01)
*B64F 5/10* (2017.01)
*B64F 5/40* (2017.01)
*B25J 9/00* (2006.01)
*B25J 19/02* (2006.01)
*B64F 5/00* (2017.01)
*B64F 5/30* (2017.01)

(52) U.S. Cl.
CPC .......... *B25J 11/005* (2013.01); *B25J 11/0075* (2013.01); *B25J 11/0085* (2013.01); *B25J 17/0283* (2013.01); *B25J 18/025* (2013.01); *B25J 19/023* (2013.01); *B64F 5/00* (2013.01); *B64F 5/10* (2017.01); *B64F 5/40* (2017.01); *B64F 5/30* (2017.01); *Y10S 901/43* (2013.01)

(58) Field of Classification Search
CPC ...... B64F 5/40; B64F 5/10; B64F 5/30; Y10T 29/49902; Y10T 29/5151; Y10T 29/53117; Y10T 29/53222; Y10T 29/53257; Y10T 29/53283; Y10T 29/53487; Y10T 29/53909
See application file for complete search history.

(56) References Cited

U.S. PATENT DOCUMENTS 9,827,677 B1 11/2017 Gilbertson et al.
2015/0375390 A1* 12/2015 Becroft .................. B25J 9/0018
427/427.2
2017/0312923 A1* 11/2017 Erickson ................ B25J 11/005

* cited by examiner

PORTABLE PROGRAMMABLE MACHINES, ROBOTIC END EFFECTORS, AND RELATED METHODS

FIELD

The present disclosure relates to portable programmable machines for performing tasks inside a confined space. The present disclosure further relates to robotic end effectors and systems including such portable work modules, as well as related methods of performing tasks within a confined space.

BACKGROUND

Although construction of modern aircraft has generally become more efficient and cost-effective, there are portions of aircraft structures for which manufacturing processes remain challenging. One of these involves completion of physical work within aircraft wing interiors by technicians. The latter is commonly associated with finalizing spar and rib securement via fasteners to wing panels and/or panels within interior portions of wings. Such access, required for swaging of collars and torqueing of nuts to bolts, also may include cleaning of cutting oils from wing panel interiors, and application of sealants to interior portions of aircraft wings. This work has involved technicians having to climb into and maneuver within confined spaces, which may be difficult and/or uncomfortable.

For example, FIG. 1 illustrates a technician positioned partially within an interior space of an aircraft wing 10. In FIG. 1, a lower panel 146 of aircraft wing 10 is shown oriented vertically during final processing of its interior portions. The lower panel 146 has a plurality of access ports 12, each incorporating a perimeter lip 13, further described below. A vertical support 14 of an assembly jig (not shown) is configured to retain the aircraft wing 10 vertically, as shown. During final processing, a technician accesses the interior (not shown in FIG. 1) of the wing for various finishing operations to be described. In FIG. 1, legs 16 and feet 18 of the technician are shown extending from an access port 12, over a walkway 20 of the assembly jig, and to a foot rest table 22 positioned on the walkway, while head and torso (neither shown) of the technician are situated within the interior of the wing 10. Such arrangements may be difficult for the technician, yet challenges remain in developing automated or semi-automated systems for performing such tasks. Existing robotic solutions have difficulties with positioning, and alignment may result in creation of foreign object debris within the confined space, have a footprint too large to work within some spaces, and/or have insufficient ranges of motion to be useful in some applications.

SUMMARY

Portable programmable machines and portable work modules according to the present disclosure (with associated robotic end effectors) are configured to perform one or more tasks within a confined space. Programmable work machines including said robotic end effectors and systems including the same also are disclosed. For example, disclosed portable programmable machines may include a first prismatic joint (e.g., a counterbalanced telescoping arm), a base configured to support the telescoping arm (and/or a structural arm, or arms, that supports the telescoping arm), a first revolute joint configured to rotate the telescoping arm, and a vision system configured to facilitate positioning of a tool (e.g., a robotic end effector) and performance of one or more tasks within the confined space. A distal end region of the telescoping arm may be unsupported by the base and include an articulating wrist configured to hold and manipulate the tool, and the telescoping arm may be configured to be translated with respect to the base. The wrist may include a plurality of joints configured to rotate and translate the tool with respect to the telescoping arm. The portable programmable machine may be configured to position the tool and perform the task autonomously and/or semi-autonomously via selectively moving the telescoping arm and the wrist with respect to the base. The base may include a power source and a programmable computer configured to process numerical data and to communicate with and control movements of the telescoping arm and the wrist.

The robotic end effector may be any suitable robotic end effector, but in some examples is a robotic end effector configured to perform a task within a confined space, wherein each performance of the task creates a piece of debris. The robotic end effector may include a debris retention structure configured to retain the piece of debris within the robotic end effector subsequent to each performance of the task by the robotic end effector, a debris catcher configured to receive the piece of debris from the debris retention structure after each performance of the task, and an actuation mechanism configured to selectively move the piece of debris from the debris retention structure to the debris catcher after each performance of the task.

Disclosed methods of performing one or more tasks within a confined space may include providing a portable work module and/or robotic end effector according to the present disclosure, securing the insert of the portable work module with respect to the access port of the confined space, calculating a desired position of the robotic end effector with respect to the confined space, based on a reference location defined by the access port of the confined space, moving the end effector to the desired position within the confined space, and performing one or more tasks within the confined space using the end effector. Disclosed methods may include performing a given task a plurality of times within a given confined space at a plurality of respective desired positions, and/or performing a plurality of different tasks within the confined space.

DESCRIPTION

Figure 1:
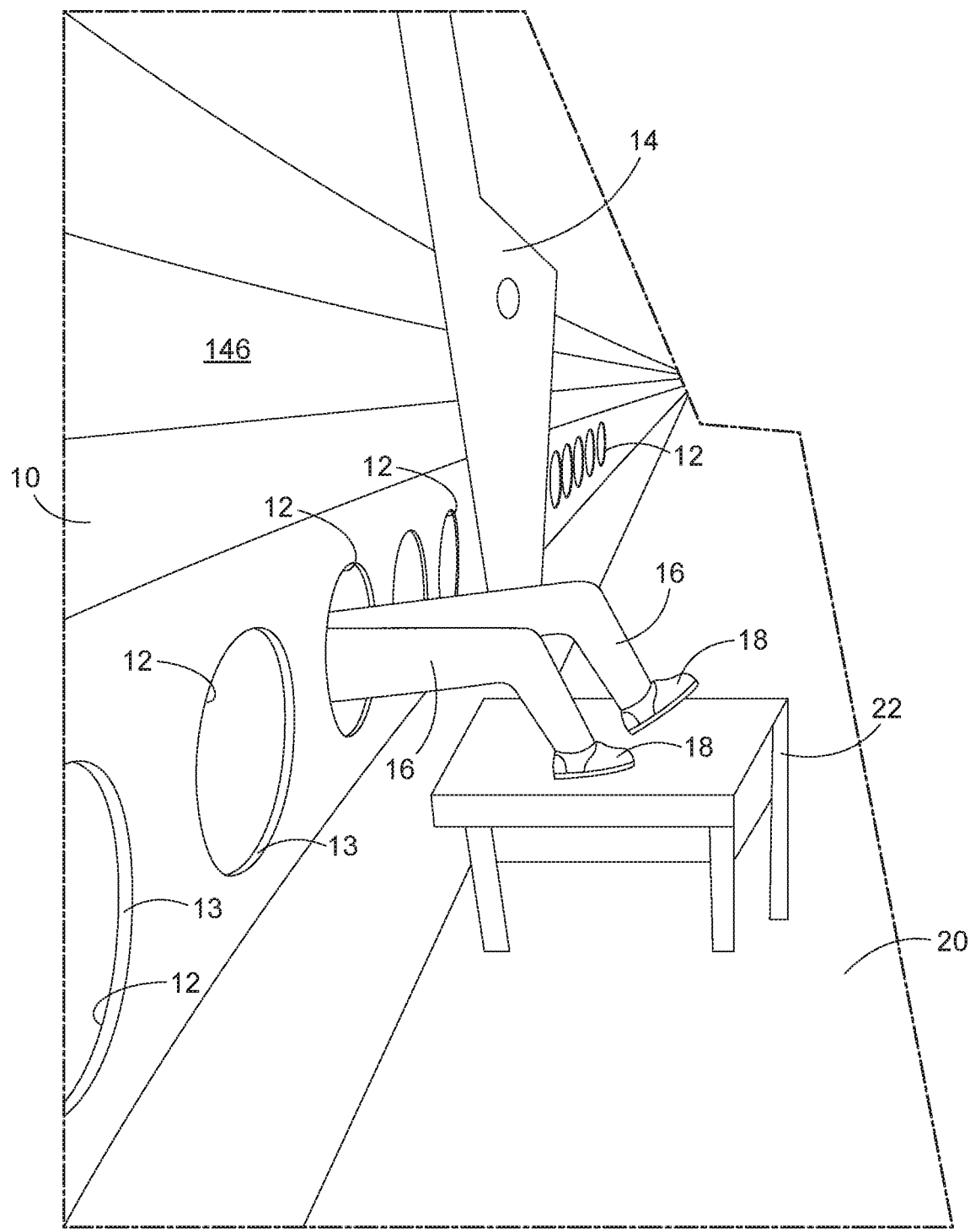
FIG. 1 is a partial perspective view of a prior art aircraft wing, vertically supported on an assembly jig, depicting legs and feet of a technician extending from an access port of the wing.
Figure 2:
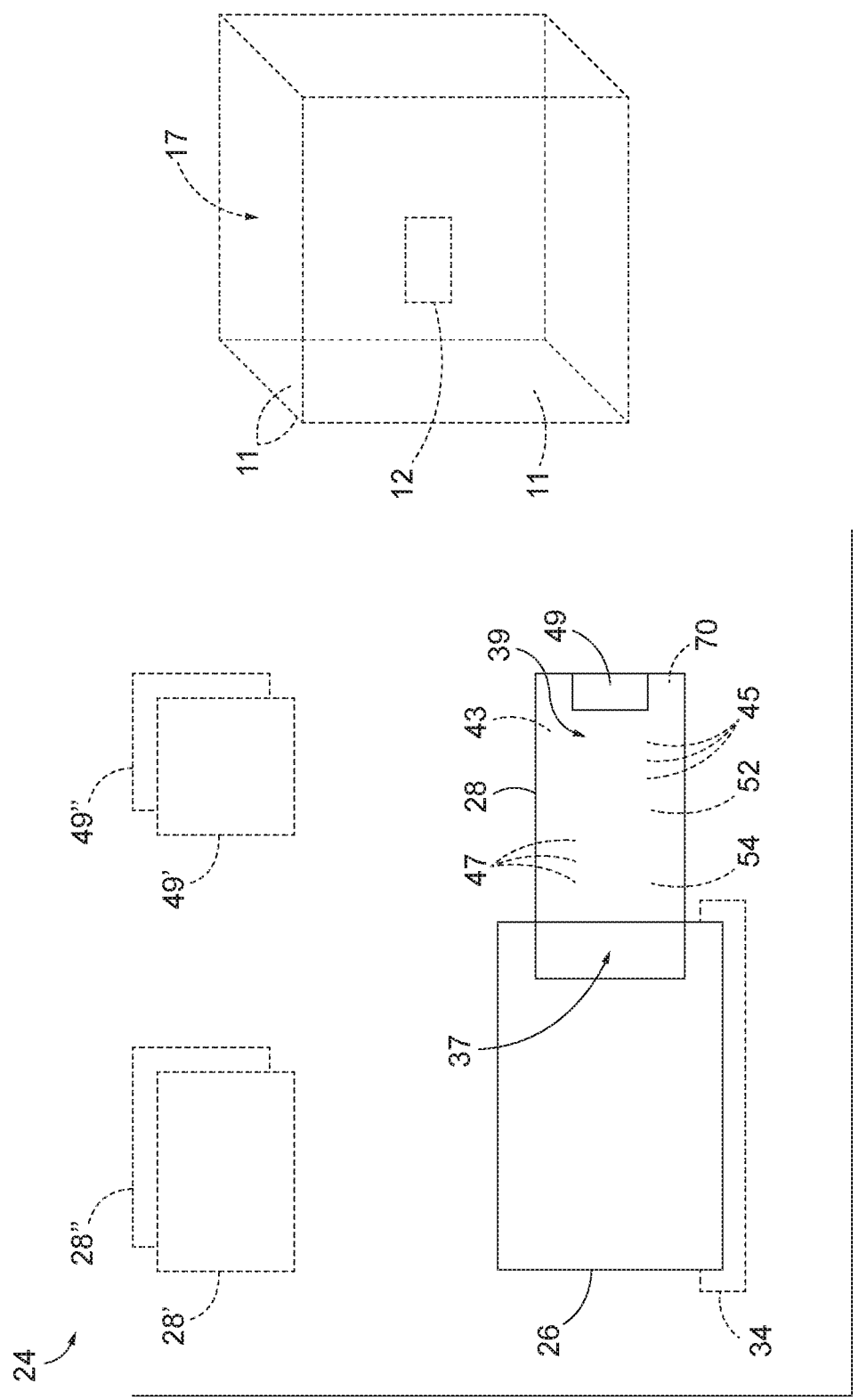
FIG. 2 is a schematic representation of non-exclusive examples of systems according to the present disclosure.

To address ergonomic and/or other difficulties with accessing and performing work within an interior space or confined space, such as within an aircraft wing (e.g., aircraft wing 10 shown in FIG. 1), presently disclosed programmable work machines 26 (also referred to herein as 'programmable robots,' or simply, 'robots') are schematically illustrated in FIG. 2. As used herein, a "confined space" is a space with limited entry and egress. The confined space may be occasionally entered by technicians but not intended for human occupancy. Moreover, in many examples, a technician cannot fully stand or otherwise fully position his or her body inside the confined space while performing a desired task. For example, and referring to FIG. 2, one or more walls, panels, or other structures 11 at least partially enclose confined space 17, thereby preventing unhampered access to confined space 17, as shown in FIG. 2. One or more access ports 12 formed through one or more structures 11 provide partial access to confined space 17. While examples described herein relate to confined spaces in the aircraft manufacturing industry, the scope of the present disclosure is not limited to the same. For example, presently disclosed programmable work machines 30 may be used to perform one or more tasks in any confined space, such as confined spaces found in the maritime or nuclear reactor industries, or any other field. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Systems 24 according to the present disclosure generally include a programmable work machine 26 having a portable work module 28 coupled thereto. Portable work module 28 is configured to move with respect to programmable work machine 26, such as via extension and contraction of a prismatic joint 47, such as a telescoping arm 52, in order to position a robotic end effector 49 (also referred to herein as a tool 49, or end effector 49) within confined space 17. In some examples, portable work module 28 includes one or more revolute joints 45 and one or more prismatic (e.g., linear) joints 47 (of which telescoping arm 52 is an example) to facilitate a plurality of degrees of freedom of a robotic end effector 49 associated with portable work module 28, within confined space 17. Portable work module 28 may include a vision system 43 configured to provide feedback and/or ensure proper positioning of portable work module 28 and/or robotic end effector 49 with respect to a specific target site within confined space 17. Vision system 43 may be manually operated, semi-autonomous, or autonomous. In some examples, vision system 43 may be configured to perform path, or trajectory, planning and/or inspection.

Programmable work machine 26 may include a mobile base 34 and/or may be positioned on mobile base 34 such that programmable work machine 26 may be mobile with respect to confined space 17. Mobile base 34 is generally configured to support portable work module 28. For example, mobile base 34 may be configured to support telescoping arm 52 (which may be counterbalanced and or may be referred to herein as a counterbalanced telescopic arm) of portable work module 28, such as by being operatively coupled to a proximal end region 37 of telescoping arm 52. Mobile base 34 may be said to "support" telescoping arm 52 even if telescoping arm 52 is not directly coupled to mobile base 34. For example, mobile base 34 may be said to "support" telescoping arm 52 if telescoping arm 52 is directly supported by a fixed or moveable arm support 32 associated with mobile base 34, such as described in connection with FIG. 3.

A distal end region 39 of telescoping arm, opposite proximal end region 37, may be unsupported by base 34, thereby being free to articulate and move with respect to base 34. Extension of telescoping arm 52 with respect to base 34 thus may translate end effector 49 with respect to base 34, by translating distal end region 39 of telescoping arm 52 with respect to base 34. In some examples, at least one of the one or more revolute joints 45 may be configured to rotate telescoping arm 52 (e.g., distal end region 39 of telescoping arm 52) with respect to base 34. Some examples of systems 24 include a wrist 70 that includes a combination of revolute joints 45 and/or prismatic joints 47 configured to move and position end effector 49 with respect to telescoping arm 52 and/or with respect to base 34. For example, wrist 70 may include one or more revolute joints 45 configured to adjust the yaw, pitch, and/or roll, respectively, of end effector 49 with respect to telescoping arm 52. Additionally or alternatively, wrist 70 may include one or more prismatic joints 47 configured to translate end effector 49 with respect to telescoping arm 52. An additional revolute joint 45 may be configured to rotate end effector 49 with respect to wrist 70, in some examples. Portable programmable machines 26 thus may provide six or more degrees of freedom for articulating (e.g., moving, positioning, and orienting) end effector 49 within a confined space, in some examples. In some examples, portable programmable machine 26 may include at least eight different prismatic and/or revolute joints 47, 45, each joint 47, 45 providing one degree of freedom to end effector 49. In some examples, one or more of the different joints 45, 47 may be redundant with one or more other of the different joints 47, 45 (e.g., providing the same degree of freedom for end effector 49). Some examples of portable programmable machines 26 may be configured to maintain a particular orientation of end effector 49 while positioning end effector 49 within a confined space.

In use, programmable work machine 26 may be positioned as desired with respect to confined space 17 (e.g., with respect to a respective access port 12 through which it is desired to access confined space 17). Programmable work machine 26 is configured to move portable work module 28 at least partially into confined space 17 such that a task or operation may be performed within confined space 17 via end effector 49 of portable work module 28. For example, end effector 49 may include one or more attachments or other tools secured to portable work module 28 and used to perform a task within confined space 17. Such operations of programmable work machine 26, portable work module 28, and/or end effector 49 may be autonomous, semi-autonomous, and/or manually operated.

In some systems 24, portable work module 28 includes an insert 54 (which also may be referred to as a collar 54) configured to engage a respective access port 12 and selectively position portable work module 28 with respect to the respective access port 12. For example, insert 54 may be a plate or other structure shaped and sized to be positioned within access port 12 and then selectively and removably secured in place with respect to access port 12. In some examples, insert 54 includes a lip or flange around at least a portion of the periphery or circumference of insert 54. Insert 54 may be configured to be secured within (e.g., substantially stationary with respect to) access port 12 while programmable work machine 26 (e.g., end effector 49 of portable work module 28) performs one or more tasks within confined space 17. For example, insert 54 may include one or more engagement features 57, such as locks and/or stops that may be configured to selectively substantially prevent movement of insert 54 with respect to access port 12 (e.g., may substantially prevent rotation and/or axial translation of insert 54 with respect to access port 12, when said engagement features 57 are engaged with access port 12 and/or structure 11). Insert 54 further may be configured to be removed from access port 12 when the one or more tasks are complete. By virtue of having a known location with respect to confined space 17, presently disclosed programmable work machines 26 may be configured to perform tasks within confined space 17 more accurately than prior art systems. For example, access port 12 may serve as a reference location, with task locations within confined space 17 being defined with respect to the reference location of access port 12 (and hence also the location of portable work module 28, when insert 54 of said portable work module is secured with respect to access port 12). Thus, systems 24 may be configured to provide a known location of programmable work machine 26 and portable work module 28 with respect to confined space 17, without programmable work machine being stationary (e.g., bolted in place to the floor or other surface). In some examples, system 24 is configured to detect whether insert 54 is secured with respect to access port 12 or not.

Portable work module 28 may be configured to perform a single task one or more times within confined space 17, or may be configured to perform a plurality of different tasks one or more times within confined space 17. Portable work module 28 and the associated end effector 49 may be configured to perform any desired task, including swaging, cleaning, applying sealants, paints, or other coatings, driving nuts or other components, moving and/or removing objects, gripping, installing one or more fasteners or other components, welding, sensing, monitoring, and/or vision-related tasks.

Portable work module 28 may be modular and/or interchangeable such that portable work module 28 is selectively removeable from programmable work machine 26 and replaced with a different portable work module 28. For example, different portable work modules 28 may be secured to a given programmable work machine 26 for different respective tasks, for use with different end effectors 49, and/or for use with different confined spaces. In some examples, systems 24 may include a plurality of portable work modules 28, with, for example, a first portable work module 28' being configured to perform a first task (and/or to engage a first size/shape of access port), and a second portable work module 28" being configured to perform a different, second task (and/or to engage a second size/shape of access port). In some examples, different portable work modules 28 may include respective inserts 54 having different shapes and/or sizes, therefore being adapted for being secured to different respective access ports 12. In this manner, a respective portable work module 28 having a desired insert 54 may be selected for a given task performed via a corresponding respective access port 12. Additionally or alternatively, different portable work modules 28 may include respective telescoping arms 52 having different shapes, sizes, degrees of freedom, and/or ranges of motion, therefore being adapted for different confined spaces.

Additionally or alternatively, end effector 49 may be modular and/or interchangeable such that end effector 49 is selectively removeable and replaceable with respect to one or more different portable work modules 28. For example, one or more of a plurality of different end effectors 49 may be secured to a given portable work module 28 for different respective tasks and/or for use with different confined spaces. Some systems 24 may include a plurality of end effectors 49, with, for example, a first end effector 49' being configured to perform a first task, and a second end effector 49" being configured to perform a different, second task. In other examples, one or more end effectors 49 may be integrally formed with a given portable work module 28. End effector 49 may include any desired type of tools or other attachments, which may include swage guns, cleaning tools, sealant tools, nut driving tools, drills, grippers, installation tools, coating or painting tools, welding tools, camera or vision tools, sensors, material removal tools, and/or any other desired tool or attachment. Some systems 24 may include a plurality of programmable work machines 26 (and therefore a plurality of respective portable work modules 28 having respective telescoping arms 52), wherein each respective programmable work machine 26 of the plurality of programmable work machines is configured to be secured with respect to a respective access port of a given confined space, such that a plurality of programmable work machines 26 may simultaneously perform tasks within the given confined space, in some examples.

Figure 3:
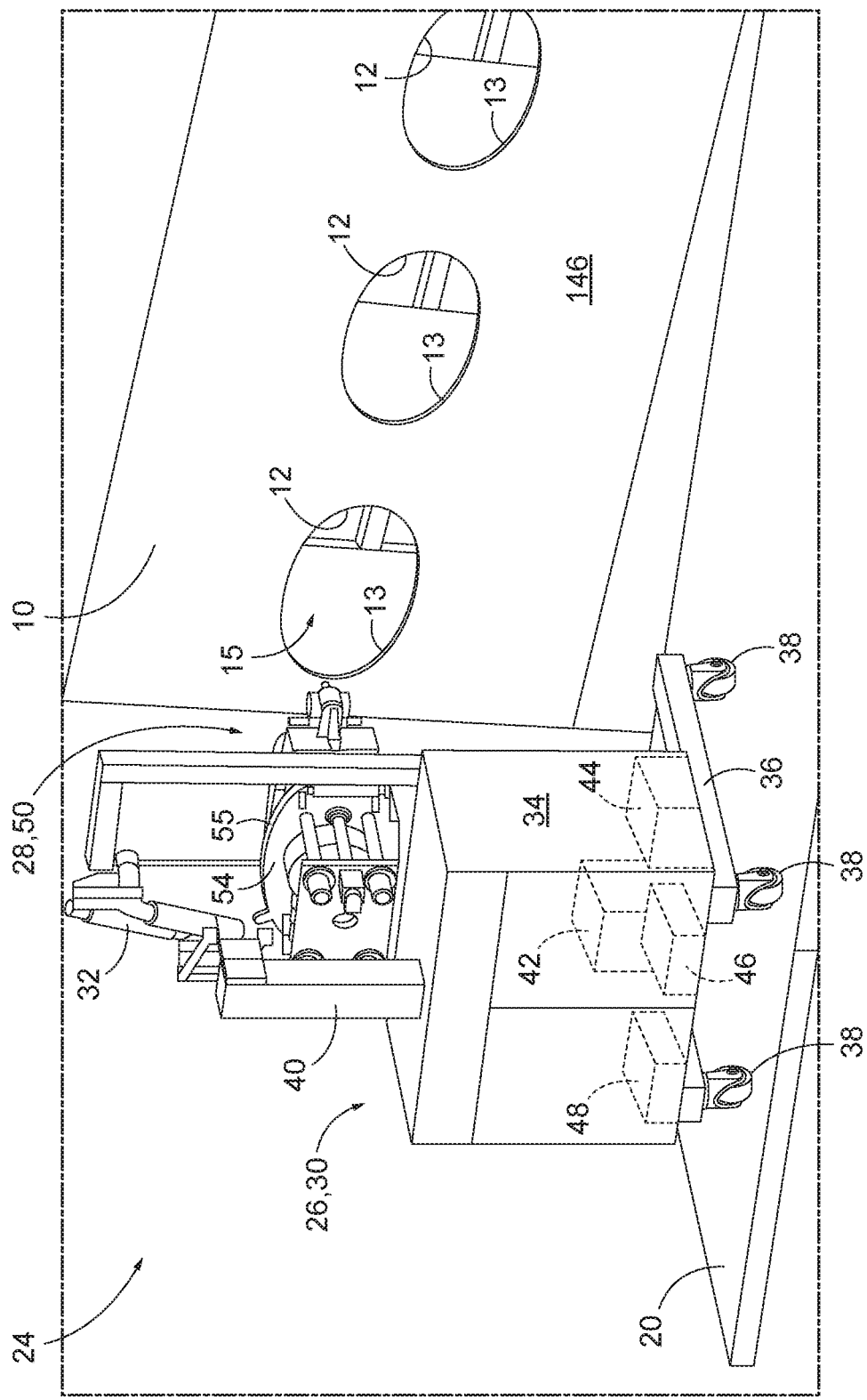
FIG. 3 is a schematic perspective representation of non-exclusive examples of a programmable work machine according to the present disclosure, viewed from a back side of the programmable work machine and in a retracted configuration.

FIG. 3 schematically illustrates an example of system 24, including a programmable work machine 30 (which is an example of programmable work machine 26) situated on walkway 20, and configured for accessing an interior space 15 (which is an example of confined space 17) of wing 10 through access ports 12 formed through wing panel 146 (which is an example of structure 11), instead of requiring the technician to access interior space 15 through access ports 12. Thus, instead of having to physically work within interior space 15 of wing 10 as shown in FIG. 1, the technician, or operator, can remain physically outside of wing 10, such as on walkway 20 or at a location remote from wing 10, to manage and/or monitor various work machine functions, as described below. Programmable work machine 30 includes a portable work module 50 (which is an example of portable work module 28) that may be configured to perform one or more different tasks within a confined space (e.g., within interior space 15 of wing 10).

To facilitate its manipulation, work machine 30 of FIG. 3 includes a moveable arm support 32 and a main body, or base, 34, which, as shown in FIG. 3, may be a cart-style base. For example, base 34 may include a frame 36 supported by lockable wheels 38 to accommodate portable movement of work machine 30 along walkway 20. In other examples, work machine 30 may be mobile or portable via other mechanisms or types of bases 34, such as via treads or air bearings. In the example of FIG. 3, a fixed arm support 40 is configured to support moveable arm support 32 and to couple moveable arm support 32 to base 34, though in other examples, moveable arm support 32 may be coupled directly to base 34. In examples having fixed arm support 40, it may be arranged in various configurations (e.g., vertically, as shown in FIG. 3, or otherwise oriented with respect to base 34).

Figure 4:
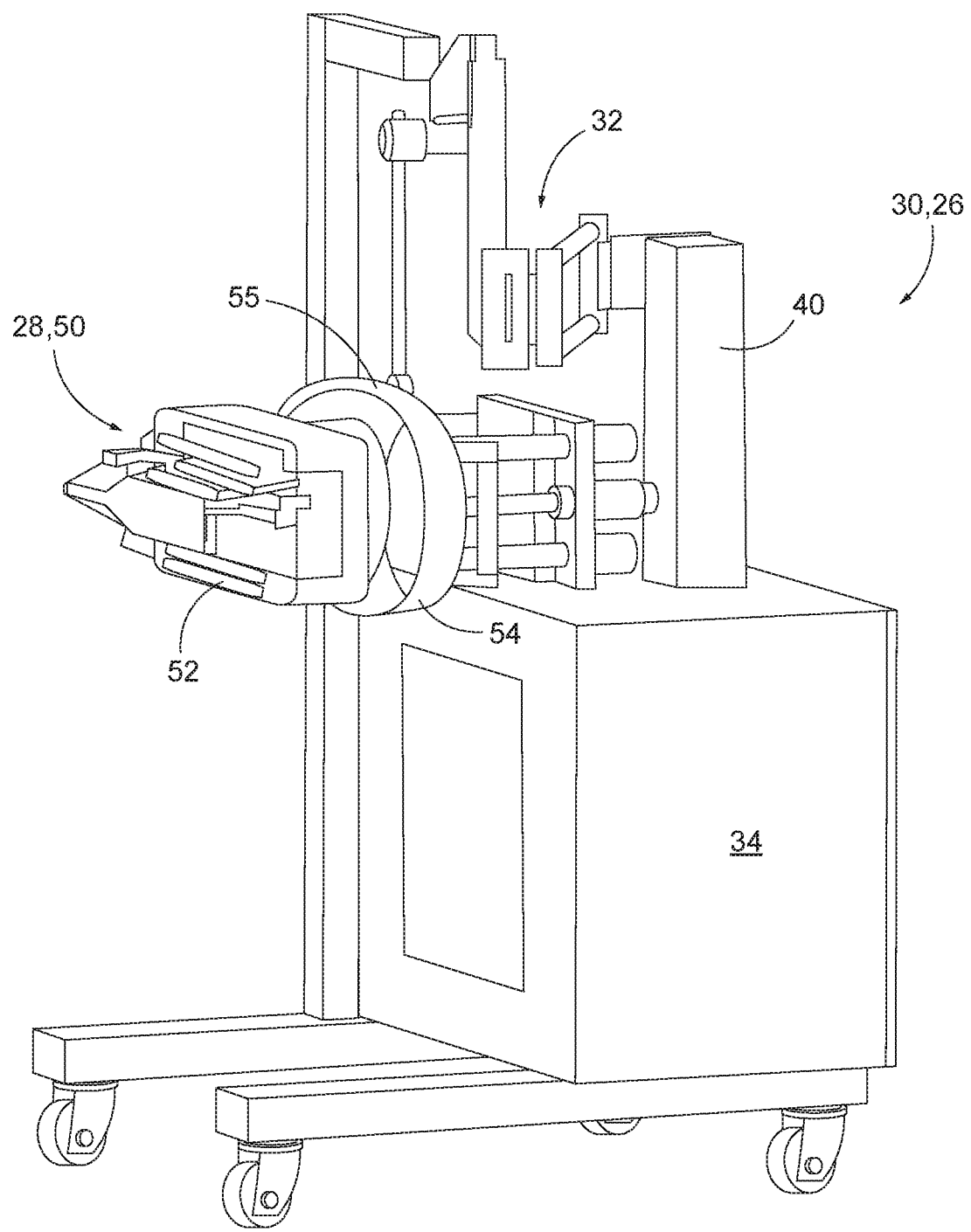
FIG. 4 is a schematic perspective representation of the programmable work machine of FIG. 3, viewed from a front side of the programmable work machine.
Figure 5:
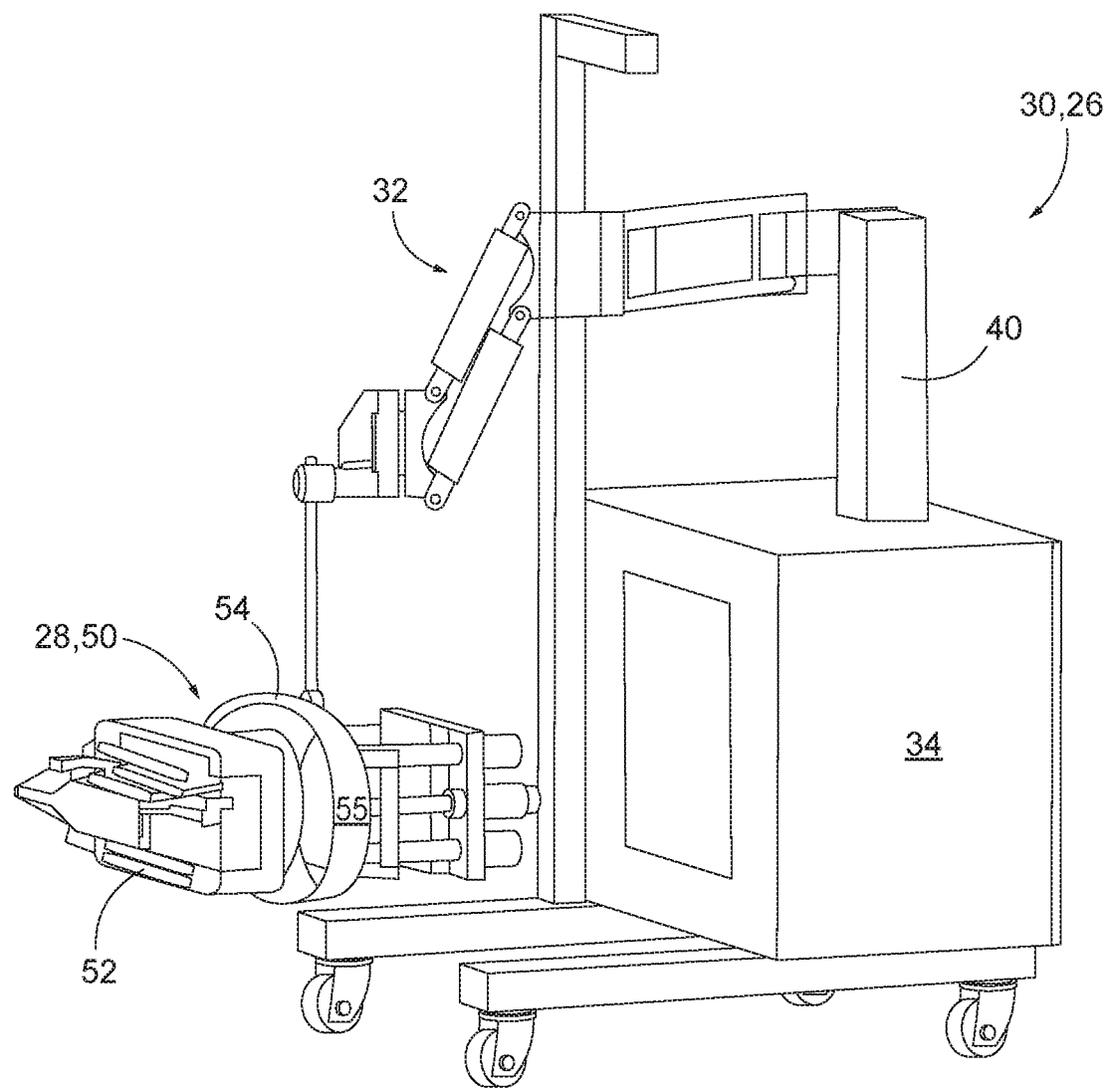
FIG. 5 is a schematic perspective representation of the programmable work machine of FIGS. 3-4, in a different position.

Moveable arm support 32 may be configured to support and facilitate placement of portable work module 50 (with telescoping arm 52) within interior space 15 by moving portable work module 50 towards a given access port 12. Moveable arm support 32 may be configured to accommodate placement of portable work module 50 in a plurality of different vertical arrangements with respect to base 34 (e.g., vertically higher than base 34, vertically adjacent base 34, and/or vertically lower than base 34). For example, FIG. 4 illustrates portable work module 50 in a first vertical position with respect to base 34, while FIG. 5 illustrates portable work module in a second vertical position with respect to base 34 (e.g., moveable arm support 32 has vertically lowered portable work module 50 in FIG. 5, as compared to its position in FIG. 4). Additionally or alternatively, moveable arm support 32 may be configured to move portable work module 50 laterally with respect to base 34, such as by moving it away from or towards base 34 and/or towards one side or the other of base 34. Additionally or alternatively, moveable arm support 32 may be configured to rotate and/or pivot portable work module 50 with respect to base 34. In this manner, base 34 may be positioned in a plurality of different positions with respect to and distances from a confined space and still be configured to access the confined space with portable work module 50. In some examples, moveable arm 32 is configured for coarse positioning of portable work module 50 with respect to an apparatus or structure having a confined space and access port thereto.

Figure 6:
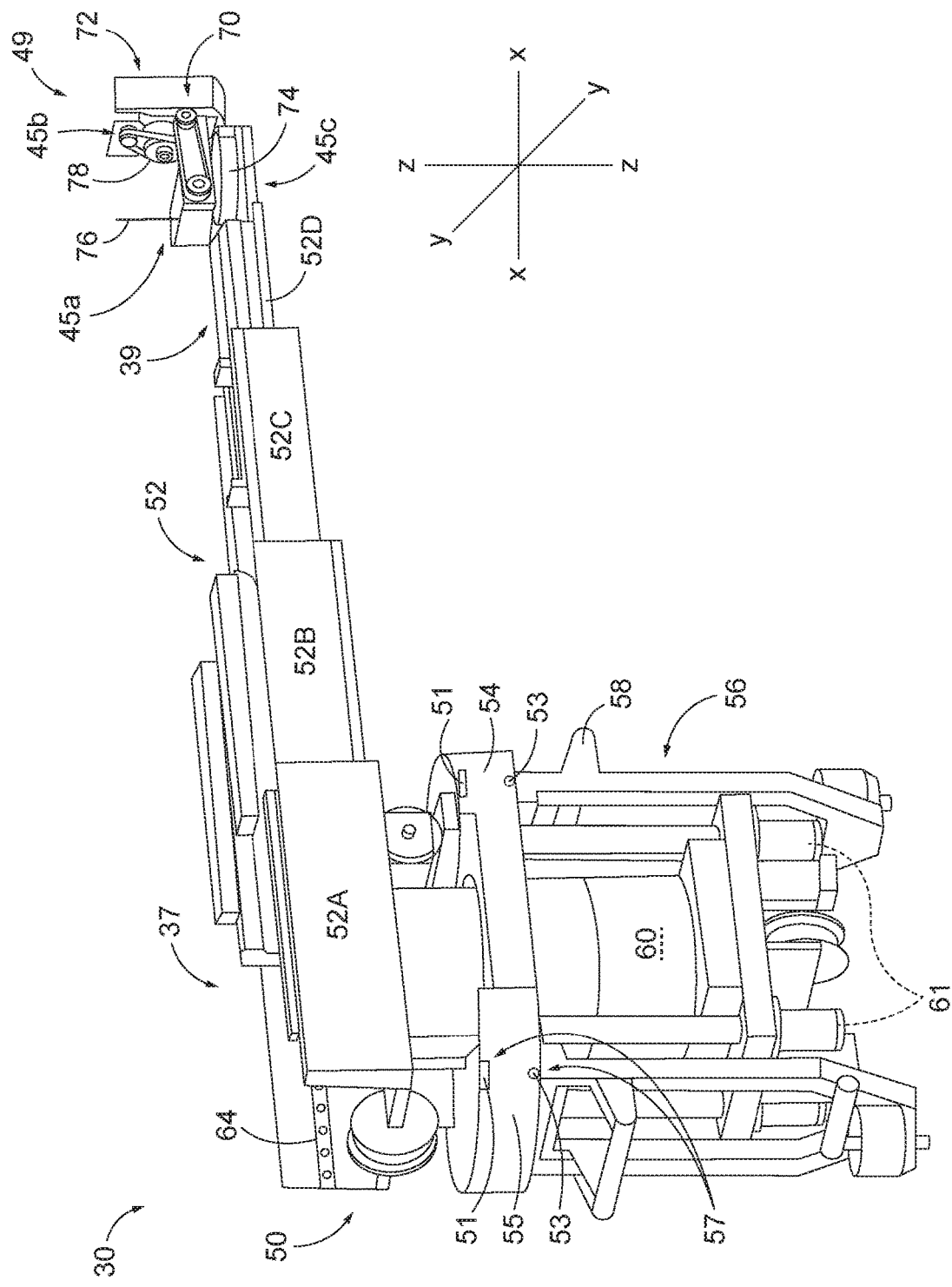
FIG. 6 is a schematic perspective representation of an example of a portable work module of the programmable work machine of FIGS. 3-5, in an extended configuration.

Referring to FIG. 6, to facilitate additional movement of portable work module 50 (and therefore movement of any tool or end effector coupled thereto or associated therewith) with respect to base 34, portable work module 50 includes telescoping arm 52 (or other prismatic joint 47), distal end region 39 of which is configured to selectively extend away from base 34 and retract towards base 34, thereby moving end effector 49 of portable work module 50 away from base 34 (towards an extended configuration of telescoping arm 52) or towards base 34 (towards a retracted configuration of telescoping arm 52), respectively. In the extended configuration, the distance between proximal end region 37 and distal end region 39 is at a maximum, while in the retracted configuration, the distance between proximal end region 37 and distal end region 39 is at a minimum. In some examples, a portion of proximal end region 37 and distal end region 39 may overlap when portable telescoping arm 52 is in the retracted configuration.

While FIGS. 3-5 illustrate telescoping arm 52 in the collapsed, or retracted configuration, FIG. 6 illustrates telescoping arm 52 in the extended configuration. In some examples, telescoping arm 52 includes one or more sections configured for progressive extension of telescoping arm 52 towards the extended configuration. For example, as shown in FIG. 6, telescoping arm 52 includes sections 52A, 52B, 52C, and 52D which are configured to move longitudinally along a telescoping arm guide rail 64 and with respect to one another, thereby extending telescoping arm 52. Work machine 30 (just a portion of which is shown in FIG. 6) may include one or more actuators 61 and/or motors 60 configured to extend telescoping arm 52. In some examples, actuators 61 and/or motors 60 may be computer-controlled to selectively extend and retract telescoping arm 52. Motor 60 may be, for example, an electric servo motor, though other types of motors also are within the scope of the present disclosure.

Referring to FIGS. 3-6, portable work module 50 also includes insert 54 configured to engage a respective access port 12 (e.g., a respective perimeter lip 13 of the respective access port 12, as shown in FIG. 3) and selectively position portable work module 50 with respect to access port 12. For example, insert 54 may be shaped and sized to be positioned within access port 12 and then selectively and removably secured in place with respect to access port 12. When positioned within or with respect to access port 12, at least a portion of a peripheral surface 55 of insert 54 may be adjacent and/or engaged with perimeter lip 13 (FIG. 3) of access port 12. Peripheral surface 55 may be, for example, a lip or flange extending around at least a portion of the periphery or circumference of insert 54. In some examples, peripheral surface 55 may be defined by a thickness of insert 54. Insert 54 may be configured to be secured at least partially within (e.g., substantially stationary with respect to) access port 12 while programmable work machine 30 (e.g., end effector 49 of portable work module 50 of programmable work machine 30) performs one or more tasks within interior space 15, such that the structure in which access port 12 is formed may at least partially support portable work module 50 (with telescoping arm 52), while insert 54 is engaged with access port 12. Insert 54 may be configured to be removed from access port 12 when the one or more tasks are complete. In some examples, telescoping arm 52 is extended after insert 54 is secured with respect to access port 12, though in other examples, telescoping arm 52 may be at least partially extended before and/or while insert 54 is secured with respect to access port 12. For such purpose, portable work module 50 may incorporates an elbow portion 56 having handles 58, as shown, for "zero-gravity" placement by the operator.

Mechanisms for securing insert 54 to access port 12 may include any suitable locks, clamps, or other engagement features 57 configured to secure and/or position insert 54 with respect to access port 12. For example, insert 54 of FIG. 6 includes a plurality of locator locks 51 and locator stops 53 spaced apart about its periphery. In use, insert 54 may be inserted axially into a given perimeter lip 13 (FIG. 3) with locator locks 51 retracted (passively or actively). For example, an operator may position insert 54 at least partially within perimeter lip 13 of access port 12, or work machine 30 may be configured to position insert 54 at least partially within or with respect to access port 12. Locator stops 53 may be configured to prevent insertion of insert 54 too far into access port 12 such that insert 54 is prevented from being axially inserted all the way through access port 12 and into the interior space access port 12 provides access to. In some examples, locator stops 53 may be projections extending from peripheral surface 55 that are configured to engage a respective structure (e.g., an outer surface of structure 11) through which access port 12 is formed, thereby preventing further axial movement of insert 54 with respect to access port 12. Locator locks 51 may be extended or otherwise engaged to secure insert 54 with respect to access port 12. In some examples, locator locks 51 are configured to substantially prevent rotational or other movement of insert 54 with respect to access port 12. For example, locator locks 51 may engage perimeter lip 13 of access port 12 and/or an inner surface of structure 11. In some examples, locator locks 51 may be biased to automatically extend once insert 54 is positioned as desired with respect to access port 12. In some examples, once insert 54 is sufficiently inserted axially through access port 12 such that locator locks 51 are positioned interiorly to access port 12 (e.g., once locator locks 51 are inside confined space 17), locator locks 51 may be configured to extend automatically (either passively, such as via a spring-loaded mechanism, or actively, such as via activation of an actuator or other mechanism) beyond the perimeter lip of access port 12, to engage an inner surface of structure 11 within confined space 17. In some examples, locater locks 51 engage access port 12 itself, such as by creating a friction fit within access port 12. Additionally or alternatively, the size and/or shape of insert 54 with respect to access port 12 may be configured to substantially prevent rotation of insert 54 with respect to access port 12, when insert 54 is positioned at least partially within access port 12. Insert 54 thus may be configured to enable registration of a reference location of portable work module 50 via a process that is repeatable for each access port 12 utilized by work machine 30.

Referring again to FIGS. 3-6, portable work module 50 may be configured to receive and manipulate one or more tools, or tool attachments (e.g., one or more end effectors 49) in order to perform one or more tasks within a confined space (e.g., within interior space 15 of FIG. 3). In some examples, portable work module 50 includes a wrist 70 (FIG. 6), which may include a wrist face 72 configured to receive one or more tools or tool attachments. Wrist 70 may be coupled to telescoping arm 52, such as within distal end region 39 of telescoping arm 52. Wrist 70 may be configured to move translationally, pivotally, and/or rotationally with respect to telescoping arm 52 (e.g., along horizontal axes X and Y, as well as vertical axis Z, all orthogonally depicted in FIG. 6). Wrist 70 may include one or more revolute joints 45 and/or one or more prismatic joints 47. For example, as shown in FIG. 6, selective movements of the wrist 70 may be effected by a series of motors, which may include a yaw rotation motor 74, a pitch rotation motor 76, and/or a roll rotation motor 78, each of which may be configured to control or actuate a respective revolute joint 45a, 45b, 45c. Depending on the particular work process being carried out, an operator may make appropriate changes of tools or tool accessories (e.g. of collar and pintail cartridges, or of nut and/or torqued portions of nut cartridges, and/or removal and installation of new sealant tubes, etc.). All of such changes may be made by quick-change cartridges in some examples. In some systems 24, portable work module 50 may include a tool changer for autonomous or semi-autonomous changing of tools or other accessories associated with telescoping arm 52.

Referring again to FIG. 3, programmable work machine 30 also may include a power source 42, such as a rechargeable or non-rechargeable battery, configured to render the programmable work machine 30 fully autonomous and/or semi-autonomous. Additionally or alternatively, programmable work machine 30 may include a programmable computer 44 and/or a hydraulic pump 46, either or both of which may be powered by power source 42. Programmable computer 44 may be configured to process numerical data and to communicate with and control movements of telescoping arm 52 and any other prismatic joints 47 and/or revolute joints 45 (e.g., wrist 70). Power source 42, computer 44, and/or hydraulic pump 46 may be positioned on or within base 34, or otherwise coupled to or supported by programmable work machine 30. A compressed air cartridge 48 also may be included for, for example, cleaning operations. For example, compressed air cartridge 48 may be configured to remove cleaning solvent from a cleaning tool after use.

Turning now to FIGS. 7-27, illustrative non-exclusive examples of end effectors 49, programmable work machines 26, and portable work modules 28 are illustrated. Where appropriate, the reference numerals from the schematic illustrations of FIGS. 2-6 are used to designate corresponding parts of the examples shown in FIGS. 7-27, however, the examples of FIGS. 7-27 are non-exclusive and do not limit tools 49, programmable work machines 30, or portable work modules 28 to the illustrated embodiments. That is, end effectors 49, programmable work machines 30, and portable work modules 28 are not limited to the specific embodiments of the illustrated FIGS. 7-27, and may incorporate any number of the various aspects, configurations, characteristics, properties, etc. of the schematic representations of FIGS. 2-6 and/or the embodiments of FIGS. 7-27, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 7-27, however, it is within the scope of the present disclosure that the previously discussed features, variants, etc. may be utilized with any of these examples.

FIGS. 7-10 illustrate various examples of end effectors 49 that may be coupled to telescoping arm 52 of portable work module 28 and utilized to conduct various finishing operations within a confined space, such as within interior space 15 of aircraft wing 10. Each of the end effectors 49 as described may be embodied in modular cartridges that can be interchangeably secured to telescoping arm 52 (e.g., to wrist face 72 of telescoping arm 52) by the technician or operator. Each end effector 49 may have multiple functions in some examples.

Figure 7:
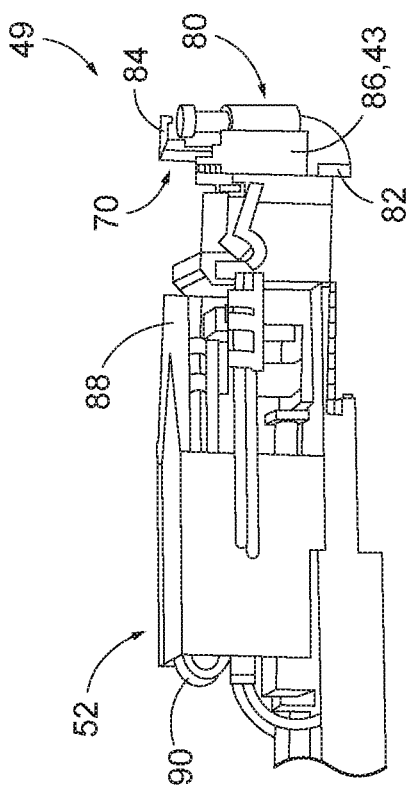
FIG. 7 is a schematic representation of an example of a tool for a programmable work machine according to the present disclosure, the tool being shown attached to a portion of a portable work module.

Referring specifically to FIG. 7, a swage gun 80 is shown secured to wrist 70. Swage gun 80 may be used to force-fit a collar member to the shank of a pin member to form a permanent connection, for example in the securement of a spar and/or stringer to a wing panel, as those skilled in the art may appreciate. In some examples, swage gun 80 may include a pintail extractor 82, one or more collar holding fingers 84, a collar feeder mechanism 88, and/or a collar and pintail storage bay 90. During a swaging operation, a technician also may utilize a vision reference camera 86 (which is an example of vision system 43), shown secured to swage gun 80, for making minor positioning adjustments, or for overriding a particular computer-based program, for example. In other examples, portable work module 28 may utilize vision system 43 autonomously or semi-autonomously. In use, collar feeder mechanism 88 may be configured to feed a respective collar from a plurality of collars contained in collar and pintail storage bay 90 to collar holding fingers 84. Swage gun 80 may be hydraulically powered, and may be configured to swage each respective collar fed via collar feeder mechanism 88 in place within a confined space when utilized with a presently disclosed robot end effector such as portable work module 50.

Figure 8:
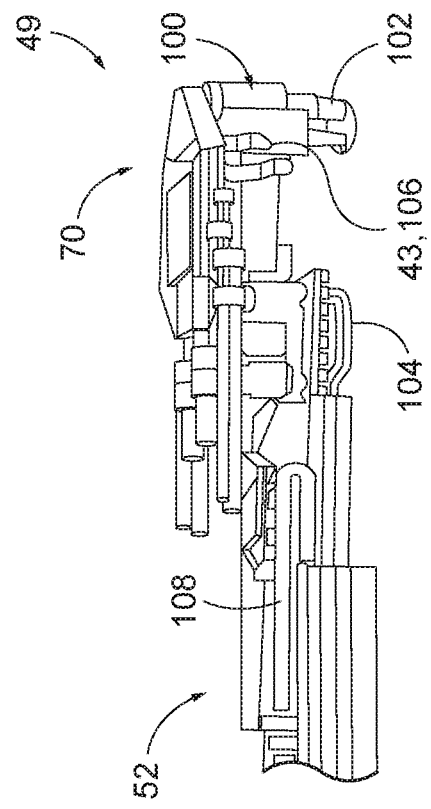
FIG. 8 is a schematic representation of another example of a tool for a programmable work machine according to the present disclosure, the tool being shown attached to a portion of a portable work module.

FIG. 8 illustrates another example of an end effector 49, in the form of a nut driving tool 100 secured to wrist 70. Nut driving tool 100 may include one or more nut-holding fingers 102, a nut feeder mechanism 104, and/or a nut storage bay 108, for securing nuts to pre-attached bolts, for example, in various portions of a confined space. In use, nut feeder mechanism 104 may be configured to feed a respective nut of a plurality of nuts contained within nut storage bay 108 to nut-holding fingers 102, in order for nut driving tool 100 to secure the respective nut in place within a confined space when nut driving tool 100 is utilized within a presently disclosed robot end effector such as portable work module 50. The nut driving tool 100 also may incorporate a vision reference camera 106 (which is another example of vision system 43) for accommodating manual intervention by a technician.

Figure 9:
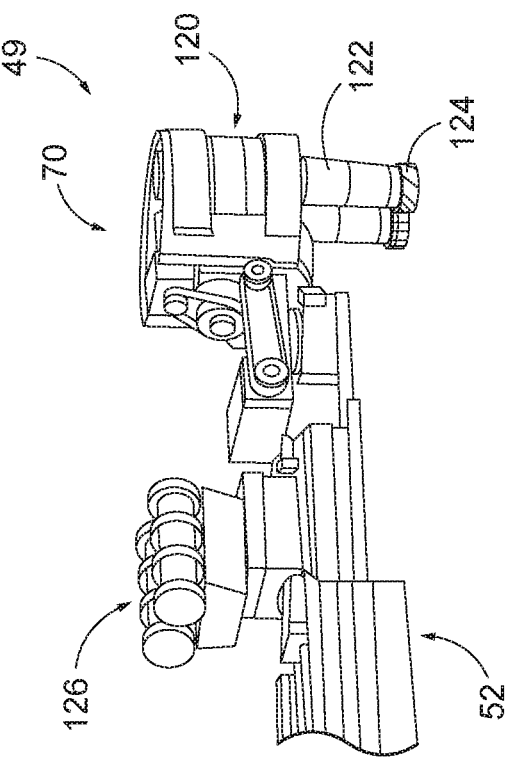
FIG. 9 is a schematic representation of another example of a tool for a programmable work machine according to the present disclosure, the tool being shown attached to a portion of a portable work module.

FIG. 9 illustrates another example of end effector 49 that may be coupled to wrist 70 (or otherwise coupled to telescoping arm 52 of portable work module 50), in the form of a cleaning tool 120 that may include a cleaning solvent storage tank 122, a set of active wiping and/or scrubbing brushes 124, and/or a set of clean/replacement brushes 126.

Figure 10:
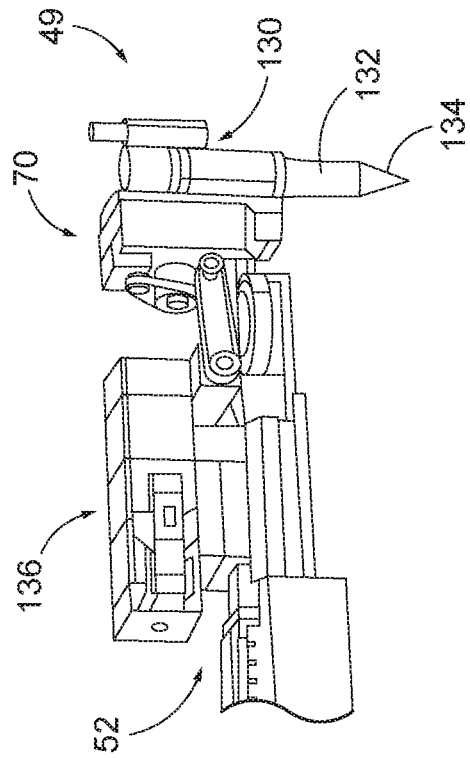
FIG. 10 is a schematic representation of another example of a tool for a programmable work machine according to the present disclosure, the tool being shown attached to a portion of a portable work module.
Figure 11:
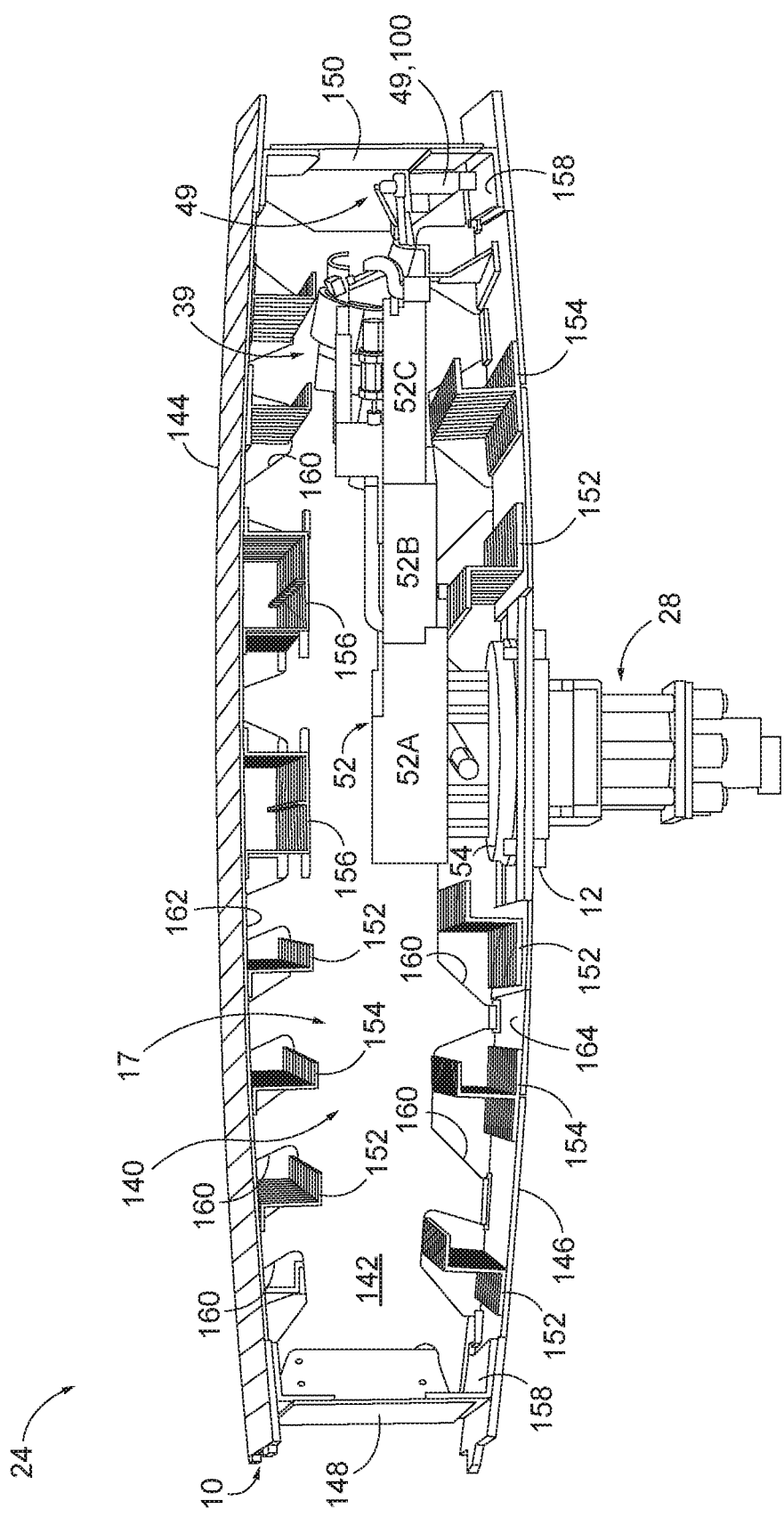
FIG. 11 is a cross-sectional view of a horizontally oriented aircraft wing, depicting an interior wing cavity between a rear and forward spar, with a portable work module of a programmable work machine according to the present disclosure supported within a perimeter lip of an access port of the wing, the portable work module being in an extended configuration.

FIG. 10 illustrates another example of end effector 49 that may be coupled to wrist 70 (or otherwise coupled to telescoping arm 52 of portable work module 50), in the form of a sealant tool 130 that may be configured to apply sealant over at least a portion of the interior surface of a confined space, such as over at least a portion of an upper interior surface 162 of upper wing panel 144 and/or over at least a portion of a lower interior surface 164 of lower wing panel 146, as shown in FIG. 11. Referring again to FIG. 10, sealant tool 130 may include a sealant nozzle 132 having a nozzle tip 134. A sealant supply tube 136 may contain a volume of sealant and may be operatively coupled to sealant nozzle 132 and nozzle tip 134 such that sealant from sealant supply tube 136 may be applied to a surface via sealant nozzle 132 and nozzle tip 134.

FIG. 11 illustrates a portion of an aircraft wing cavity 140 in cross section across a single bay, as another example of confined space 17, within the interior of an aircraft wing 10, wherein an interior rib 142 extends between rear and forward spars 148, 150, respectively, as shown. As shown in FIG. 11, portable work module 28 may be secured within or with respect to access port 12 via insert 54, and telescoping arm 52 is shown partially extended between upper and lower wing panels 144, 146, respectively, within wing cavity 140. The remainder of portable work module 28 and associated programmable work machine 26 are not shown in FIG. 11, for clarity.

In the example of FIG. 11, a nut driving tool 100 (which is an example of end effector 49) is shown positioned for securement of a spar cap 158 of forward spar 150 to lower wing panel 146. Within wing cavity 140 are shown a plurality of stringers utilized for stiffening of upper and lower wing panels 144, 146. For example, Z-shaped stringers 152, T-shaped stringers 154, and/or U-shaped stringers 156 may be used selectively and for distinct purposes within wing cavity 140. For example U-shaped stringers 156 may be configured to provide passageways for protection of electrical and hydraulic lines from fuel contamination. For uninterrupted passage of the elongated stringers between ribs, those skilled in the art will appreciate that rib 142 may include one or more openings 160, as shown.

Figure 12:
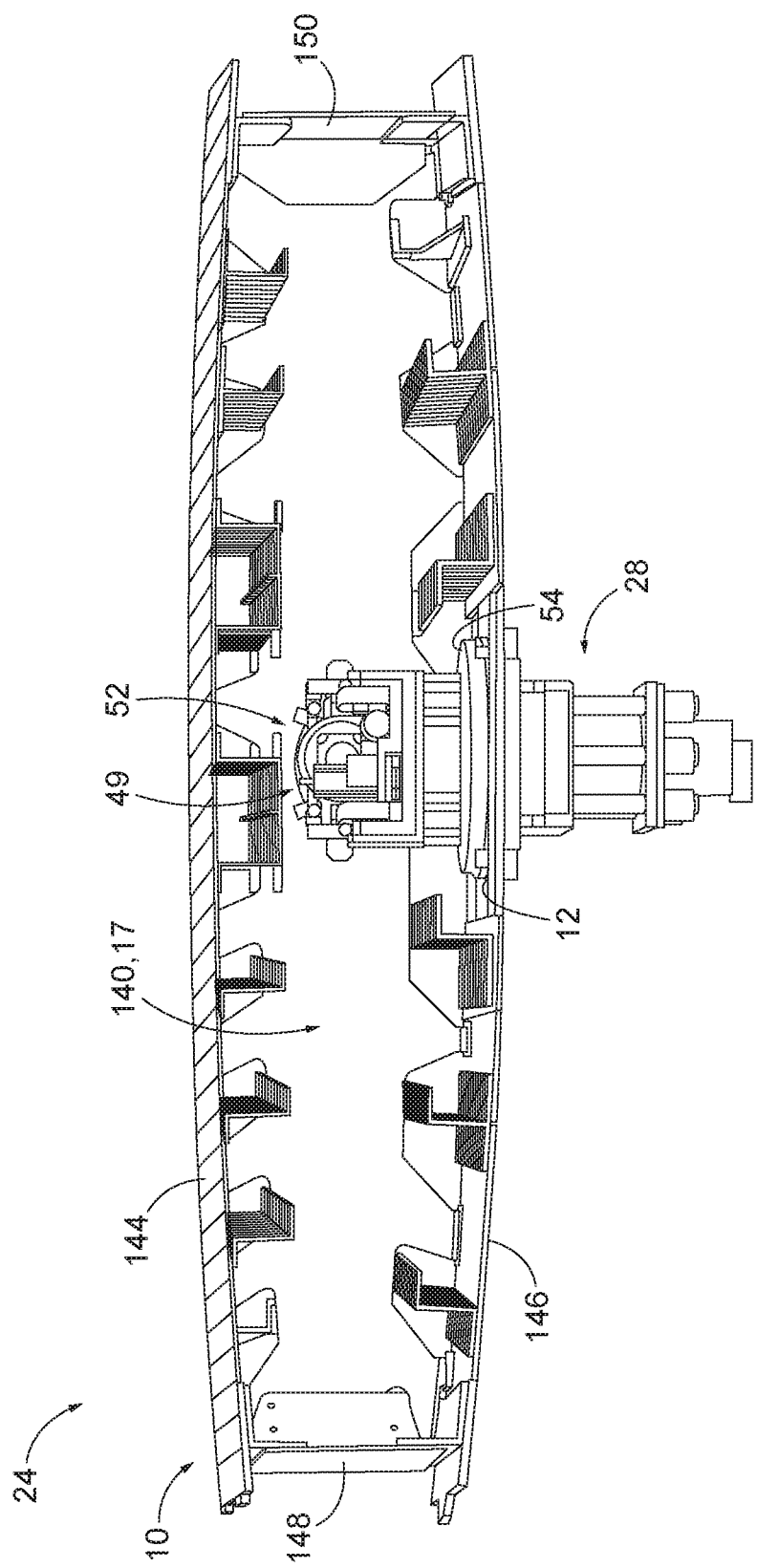
FIG. 12 is the aircraft wing and portable work module of FIG. 11, with the portable work module being in a retracted configuration.

While portable work module 28 is shown in an extended configuration in FIG. 11 (e.g., with distal end region 39 of telescoping arm 52 extended away from insert 54) to perform work spaced apart from access port 12, FIG. 12 illustrates portable work module 28 in a retracted, or compacted, configuration, with telescoping arm 52 retracted such that portable work module 28 has a reduced footprint as compared to the extended configuration of FIG. 11. Generally, portable work module 28 is configured to be compressed, compacted, and/or retracted such that its footprint is no larger than that of insert 54. In this manner, portable work module 28 is configured to be removed from confined space 17 (e.g., wing cavity 140) via access port 12.

FIGS. 13-22 illustrate an example of portable work module 28, in the form of a portable work module 166 that may be utilized with systems 24 and programmable work machines 26 disclosed herein. Portable work module 166 is configured to have a plurality of degrees of freedom facilitated by a combination of one or more revolute joints 45 and one or more prismatic (e.g., linear) joints 47. Portable work module 166 is configured to fit within and perform one or more tasks within a confined space (e.g., confined space 17, such as within wing cavity 140), as well as being configured to articulate to different spaces or areas within the confined space. Portable work module 166 may be configured to maintain a specific orientation or one or more end effectors 49 and/or joints 45, 47 while being deployed and/or positioned within the confined space and may include one or more redundant joints.

Figure 14:
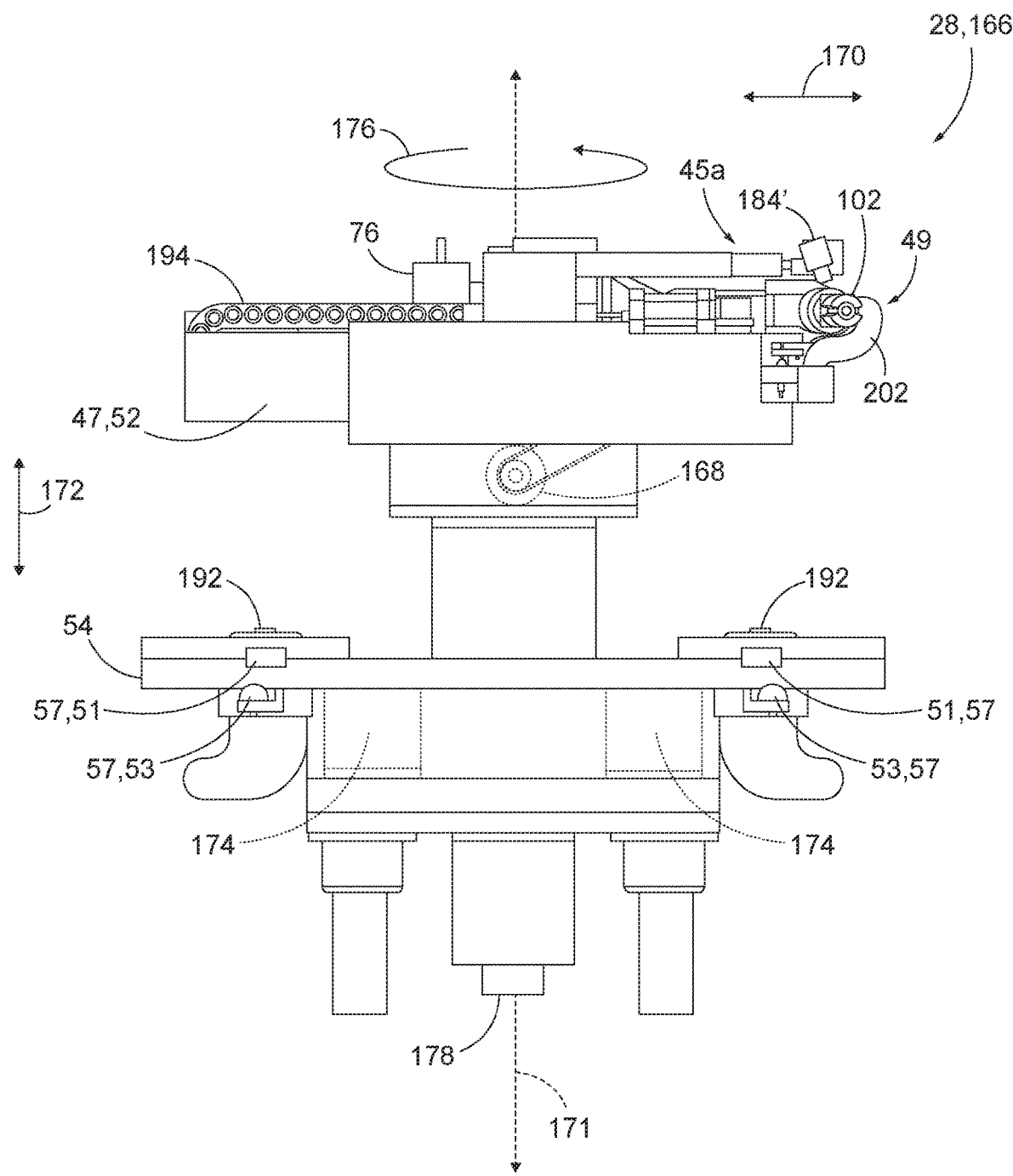
FIG. 14 is a side elevation view of a portable work module according to the present disclosure.
Figure 15:
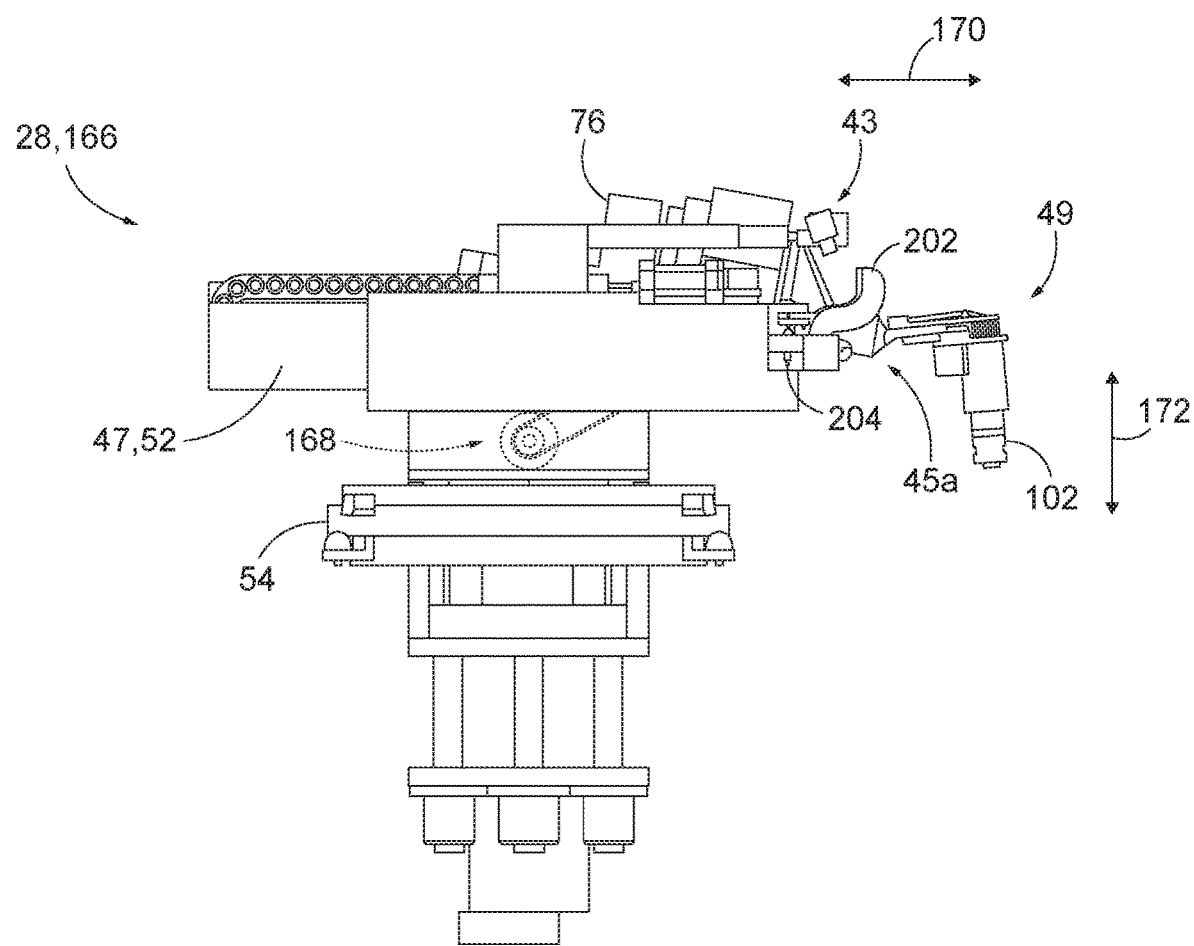
FIG. 15 is a side elevation view of a portable work module according to the present disclosure, in a retracted configuration.
Figure 16:
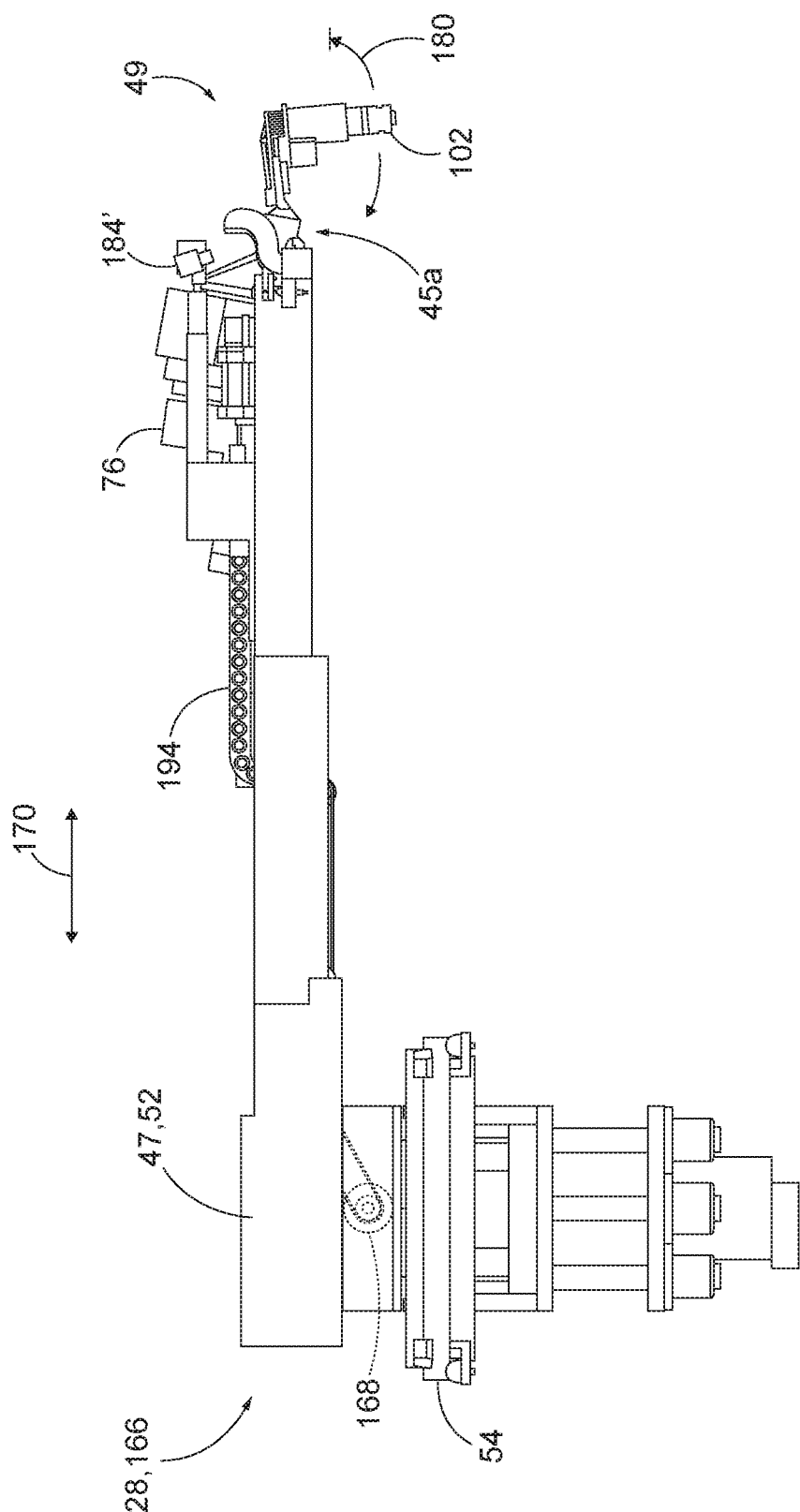
FIG. 16 is a side elevation view of the portable work module of FIG. 15, in an extended configuration.
Figure 17:
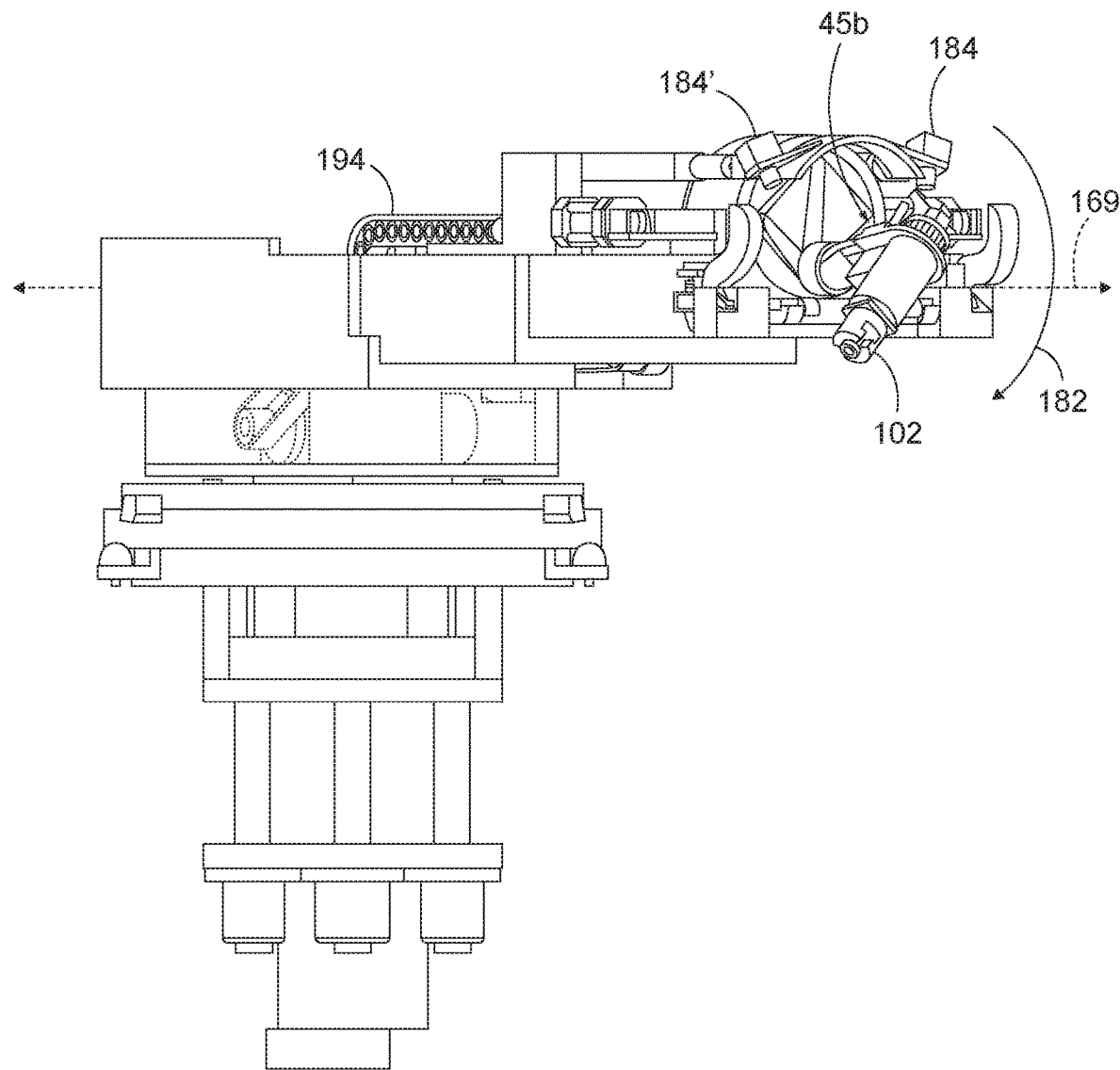
FIG. 17 is a perspective view of the portable work module of FIGS. 15-16 illustrating a particular movement direction of the robotic end effector of the portable work module.

For example, portable work module 166 includes linear, prismatic joint 47 in the form of telescoping arm 52 that is configured to extend and contract to selectively move end effector 49 towards or away from insert 54 and position end effector 49 within a confined space. Telescoping arm 52 is shown at least partially extended in FIG. 13, and is shown contracted in FIG. 14. A length of telescoping arm 52 in the extended configuration is greater than the length of telescoping arm in the contracted (or retracted) configuration. FIGS. 15-16 illustrate a side view of portable work module 166, showing telescoping arm 52 in a retracted configuration (FIG. 15) and an extended configuration (FIG. 16). FIGS. 15-16 illustrate positioning of end effector 49 with respect to insert 54 (e.g., end effector 49 is positioned farther away from insert 54 when telescoping arm 52 is in the extended configuration of FIG. 16 than it is when telescoping arm 52 is in the retracted configuration of FIG. 15). A Y-axis motor 168 may be configured to drive telescoping arm 52 (and/or one or more other prismatic joints 47), thereby providing a degree of freedom for end effector 49 along a Y-axis (e.g., along the directions indicated by arrow 170 in FIGS. 13-16), such as along a longitudinal Y-axis 169 of telescoping arm 52.

Figure 13:
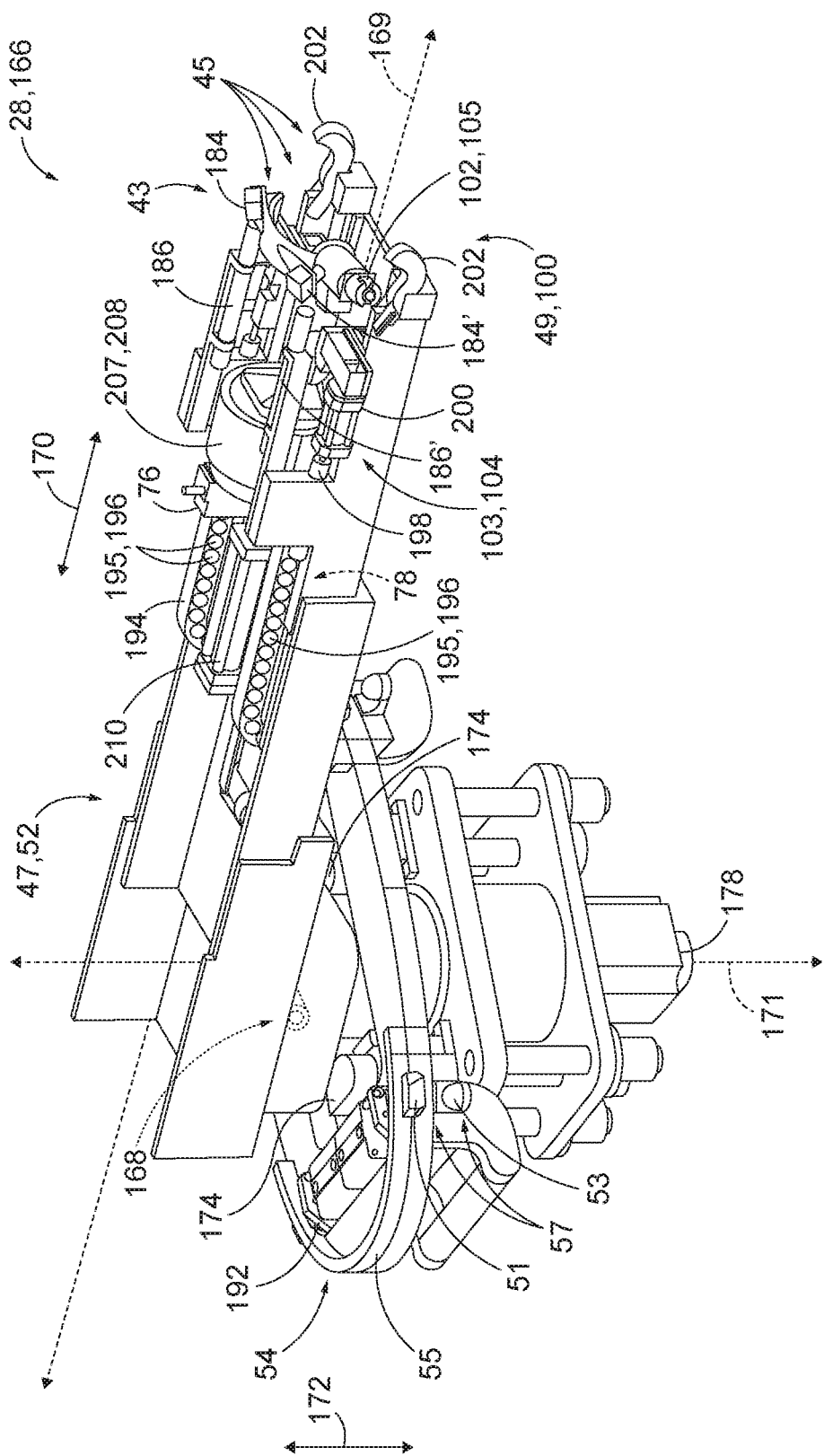
FIG. 13 is a perspective view of another example of a portable work module according to the present disclosure.

In addition to portable work module 166 being configured to translate end effector 49 along Y-axis 169, portable work module 166 is also configured to translate end effector 49 along a Z-axis 171, along the directions indicated by arrow 172. For example, one or more Z-axis motors 174 (two Z-axis motors 174 are shown in FIGS. 13-14) are configured to selectively translate telescoping arm 52 and end effector 49 vertically with respect to insert 54, in the directions indicated by arrow 172. For example, FIG. 14 illustrates telescoping arm 52 and end effector 49 in a raised position with respect to insert 54 as compared to FIG. 15, which illustrates telescoping arm 52 and end effector 49 in a lowered position with respect to insert 54. In the lowered position shown in FIG. 15, telescoping arm 52 is positioned adjacent insert 54, while in the raised position shown in FIG. 14, telescoping arm is spaced apart from insert 54 along Z-axis 171.

In addition to portable work module 166 being configured to translate along Z-axis 171 and Y-axis 169, portable work module 166 is also configured to rotate about Z-axis 171 (e.g., in the direction indicated by arrow 176 in FIG. 14), via one or more C-axis motors 178. In other words, telescoping arm 52 and end effector 49 are configured to rotate about Z-axis 171, with respect to insert 54, thereby providing yet another degree of freedom for positioning end effector 49 within a confined space. Movement of telescoping arm 52 and end effector 49 via Y-axis motor 168, Z-axis motor 174, and/or C-axis motor 178 may be configured for coarse positioning of end effector 49 within confined space. Portable work module 166 includes one or more additional motors or actuators configured for fine positioning of at least a portion of end effector 49 within a confined space. In some examples, the one or more additional motors or actuators configured for fine positioning of at least a portion of end effector 49 are configured to move (e.g., rotate and/or translate) at least a portion of end effector 49 with respect to telescoping arm 52 and/or another prismatic joint 47.

For example, portable work module 166 includes a pitch rotation motor 76 and a roll rotation motor 78 configured to rotate a portion of end effector 49, such as a nut manipulator, or nut-holding fingers 102 with respect to telescoping arm 52. Pitch rotation motor 76 drives or actuates a first revolute joint 45a (which is an example of revolute joint 45) that adjusts the pitch of nut-holding fingers 102 (or other portion of end effector 49) with respect telescoping arm 52, such as by rotating nut-holding fingers 102 in the directions indicated by arrow 180 in FIG. 16, with respect to telescoping arm 52. Similarly, roll rotation motor 78 (FIG. 13) drives or actuates a second revolute joint 45b (FIG. 17), which is an example of revolute joint 45, that adjusts the roll of nut-holding fingers 102 (or other portion of end effector 49) with respect to telescoping arm 52, such as by rotating nut-holding fingers 102 about Y-axis 169, with respect to telescoping arm 52 (e.g., in the directions indicated by arrow 182 in FIG. 17). Additionally or alternatively, portable work module 166 may include one or more additional revolute joints and associated motors or actuators to provide additional degrees of freedom, such as to adjust the yaw of nut-holding fingers 102 with respect to telescoping arm 52.

While portable work module 166 has the plurality of degrees of freedom described above (e.g., translation along Y-axis 169, translation along Z-axis 171, rotation about Z-axis 171, and pitch, roll, and/or yaw of at least a portion of end effector 49), other examples of portable work modules 28 may be configured to have more, fewer, and/or different degrees of freedom than described in connection with portable work module 166. In this manner, portable work module 166 may be configured to be compacted to fit into a confined space and then be deployed and articulate within the confined space, such as to the interior edges of the space (e.g., the edges of the interior cavity of a wing box). In some examples, portable work module 166 is configured to maintain a specific orientation of at least a portion of end effector 49 as end effector 49 is deployed to a specific location or position within the confined space (e.g., portable work module 166 may be configured to maintain a specific orientation of nut-holding fingers 102 with respect to telescoping arm 52, as telescoping arm 52 is extended and/or retracted along Y-axis 169, raised and/or lowered along Z-axis 171, and/or rotated about Z-axis 171). In some examples, portable work module 166 includes one or more redundant joints for maintaining the desired orientation of at least a portion of end effector 49 (e.g., the desired orientation of nut-holding fingers 102) relative to the path of end effector 49 within the confined space (e.g., relative to movement of telescoping arm 52 or other prismatic joint 47 with respect to insert 54). Generally, prismatic joints 47 and revolute joints 45 are described as facilitating motion of portions of portable work module 166 with respect to insert 54, as when portable work module 166 is in use within a confined space, insert 54 is configured to remain stationary with respect to the confined space (e.g., insert 54 is generally substantially stationary with respect to and secured to an access port of the confined space).

Portable work module 166 includes a vision system 43 which may be configured to locate studs or other features or targets within confined space 17, to align a tool of portable work module 166 (e.g., nut-holding fingers 102) to perform a task, and/or to inspect a target within the confined space after the task has been performed. For example, vision system 43 may include a first and second camera 184, 184', which may be telescoping cameras. In some examples, vision system 43 includes corresponding first and second camera extend pistons 186, 186' configured to extend cameras 184, 184', respectively. For example, camera extend piston 186 is configured to translate camera 184 with respect to telescoping arm 52 and/or insert 54, such as along Y-axis 169, in order to effectively position camera 184 to view the tool and/or a target feature or site within the confined space. Similarly, camera extend piston 186' is configured to translate camera 184' with respect to telescoping arm 52 and/or insert 54, such as along Y-axis 169 to effectively position camera 184' to view the tool and/or a target feature of site within the confined space. In some examples, vision system 43 is configured such that cameras 184, 184' triangulate to determine the position and/or orientation of end effector 49 with respect to a target within the confined space and/or to determine the position and/or orientation of the target with respect to the end effector 49. Additionally or alternatively, camera 184 and/or camera 184' (and/or other components of vision system 43) may be configured to move with end effector 49, instead of, or in addition to, being configured to extend or translate with respect to end effector 49.

Figure 18:
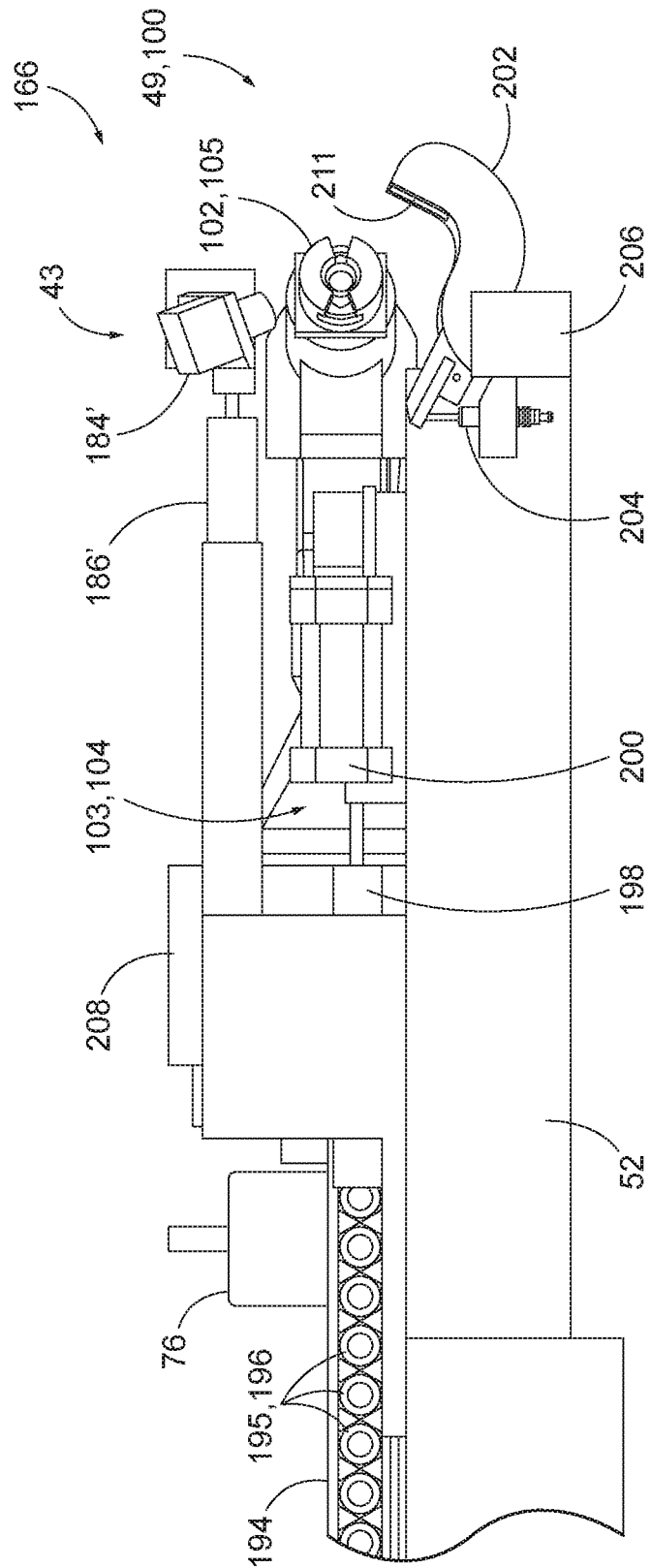
FIG. 18 is a close-up side elevation view of a portion of the end effector of the portable work module of FIGS. 15-17, illustrating a reload position of the end effector.
Figure 21:
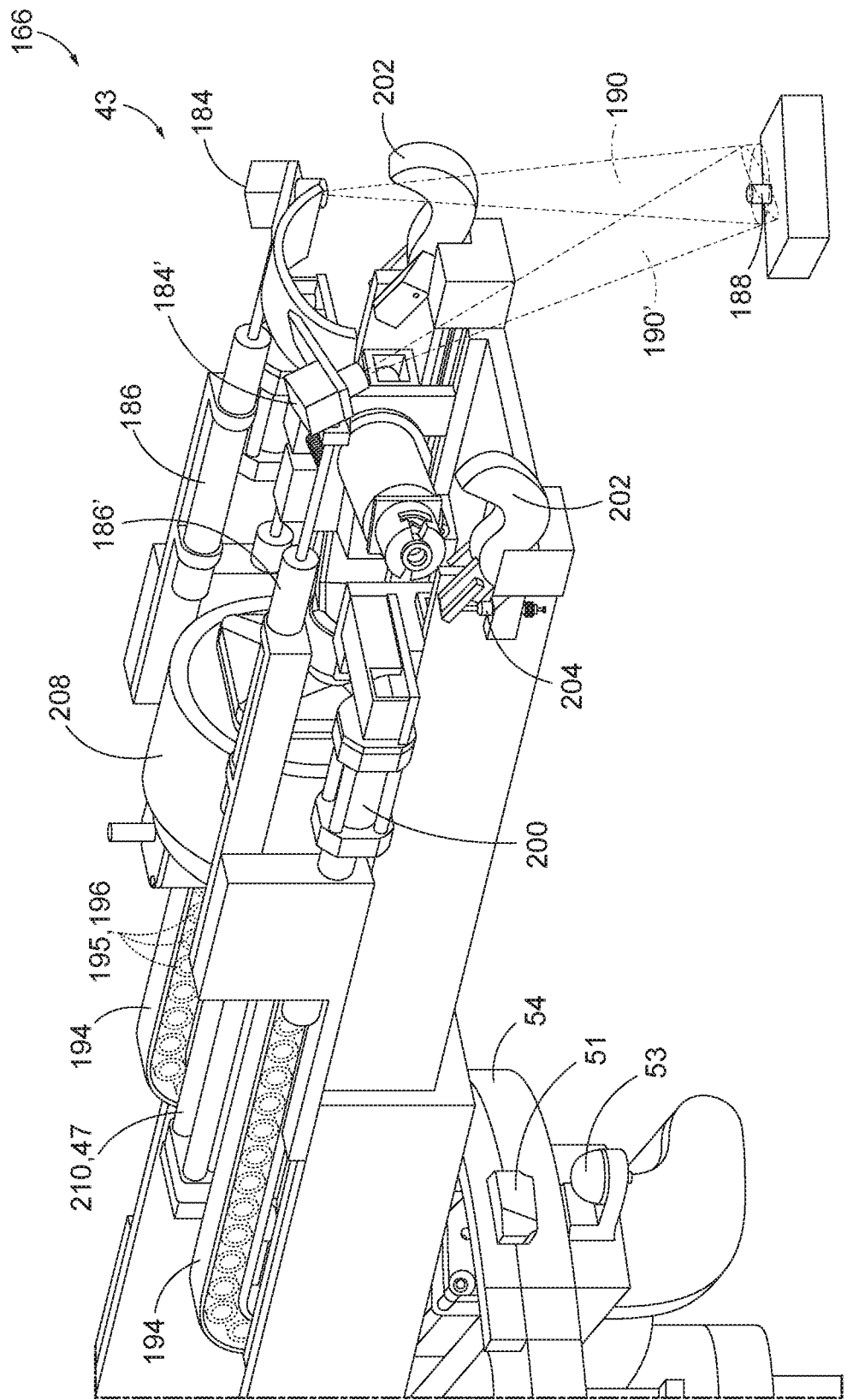
FIG. 21 is a perspective view of a portion of the portable work module of FIGS. 15-20, representing operation of a vision system within a confined work space.

Vision system 43 may be designed to minimize its footprint. For example, cameras 184, 184' may be positioned above end effector 49 and retracted, when not in use. FIGS. 13 and 18, for example, illustrate vision system 43 in a retracted configuration, while FIG. 21 illustrates vision system 43 in an extended configuration, with camera extend pistons 186, 186' extended to position cameras 184, 184' out in front of end effector 49 to inspect a target 188 within a confined space (e.g., a stud fixed within a wing box cavity). First camera 184 may be configured to inspect target 188 from a different angle than second camera 184', such as to ensure proper installation of the stud at target 188. First and second cameras 184, 184' may have respective fields of vision 190, 190' that at least partially overlap at target 188. While vision system 43 is illustrated with two cameras 184, 184', in other examples, vision system 43 may include more or fewer cameras 184.

As best seen in FIGS. 13-14, portable work module 166 includes two locking cylinders 192 (though other examples may include more or fewer locking cylinders 192), each locking cylinder 192 having one or more respective locator locks 51 that extend radially outward from peripheral surface 55 of insert 54 when locking cylinders 192 are activated. For example, when locking cylinders 192 are not activated, locator locks 51 may be retracted, such that they are substantially flush with peripheral surface 55 of insert 54, or positioned radially inward from peripheral surface 55 of insert 54, and when locking cylinders 192 are activated, locator locks 51 may be extended such that they extend radially outward beyond peripheral surface 55 of insert 54. In this manner, locking cylinders 192 may be deactivated when positioning insert 54 within an access port, such that locator locks 51 do not interfere with such positioning. Additionally or alternatively, locator locks 51 may be spring-loaded such that locator locks are biased to be positioned extending radially beyond peripheral surface 55 of insert 54, yet are forced radially inward when pressed inward, such as from contact with an access port when portable work module 166 is being inserted into or through the access port.

Locking cylinders 192 may be activated once insert 54 is positioned at least partially within an access port to substantially secure insert 54 in place within and with respect to the access port. For example, locator locks 51 may engage with and/or form a friction fit between insert 54 and the access port when locking cylinders 192 are activated, and/or locator locks 51 may extend beyond a perimeter lip of the access port and engage an inner surface of the confined space. Insert 54 of portable work module 166 also includes one or more locator stops 53 (best seen in FIG. 21) that extend radially outward beyond peripheral surface 55 of insert 54 and are configured to prevent insertion of insert 54 too far into or through an access port. For example, locator stops 53 may be oriented to face or be parallel to an outer surface of the confined space, through which the access port is formed, whereas peripheral surface 55 of insert 54 may be oriented to be substantially perpendicular to the outer surface of the confined space.

End effector 49 of portable work module 166 is illustrated in the form of nut driving tool 100. With nut driving tool 100, portable work module 166 is configured to fasten (e.g., install) frangible nuts having a collar portion that breaks off during installation (e.g., to limit the tightening force applied by the nut), though in other examples, end effector 49 may be configured to install different fasteners, which may be frangible or non-frangible. To facilitate installation of a plurality of such frangible nuts (or other fasteners), portable work module 166 (e.g., nut driving tool 100 of portable work module 166) includes one or more nut cartridges 194 (two nut cartridges 194 are shown, though other examples of portable work module 166 may include more or fewer nut cartridges 194) each having (e.g., storing) a plurality of fasteners 195 (or other components), such as nuts 196, contained therein. An actuation mechanism 103, such as a nut feeder mechanism 104, may be configured to feed respective nuts 196 (or other fasteners or components), one at a time, from one or both of nut cartridges 194, to nut-holding fingers 102 (or other portion of end effector 49). For example, nut feeder mechanism 104 may include a respective nut feeder piston 198 configured to feed a respective nut 196 from each respective nut cartridge 194 into position to be delivered to nut-holding fingers 102, and a nut inserting piston 200 that may be configured to insert each subsequent respective nut 196 into nut-holding fingers 102.

Once each respective nut is installed, the debris created by the installation (e.g., the broken collar portion) must be removed from the confined space. To this end, end effector 49 may include a debris retention structure 105 configured to retain the piece of debris within end effector 49 subsequent to each performance of the task (e.g., debris retention structure 105 may be configured to retain the broken collar portion after each frangible nut is installed). In this example, nut-holding fingers 102 serve as debris retention structure 105, though other configurations also are possible.

Nut driving tool 100 also includes one or more debris catchers, or receptacles, 202 for receiving foreign object debris, such as the collars broken off from nuts 196 after installation of the nut. For example, debris catchers 202 may be hollow structures with an internal space and an opening 211 large enough to accommodate the debris they are configured to receive, yet enclosed enough to substantially prevent the debris from falling into the confined space. Debris catcher 202 is configured to receive the piece of debris from debris retention structure 105 (e.g., nut-holding fingers 102) after each performance of the task. For example, debris retention structure 105 may be configured to retain the piece of debris until the piece of debris is received by debris catcher 202. In some examples, actuation mechanism 103 is configured to selectively move the piece of debris from debris retention structure 105 to debris catcher 202 after each performance of the task (e.g., after each nut is installed). Debris catchers 202 may be configured to retain the pieces of debris (e.g., from multiple performances of the task) until removal of end effector 49 from the confined space in which the tasks are being performed. In this manner, the debris is likewise removed from the confined space when end effector 49 is removed from the confined space.

Figure 19:
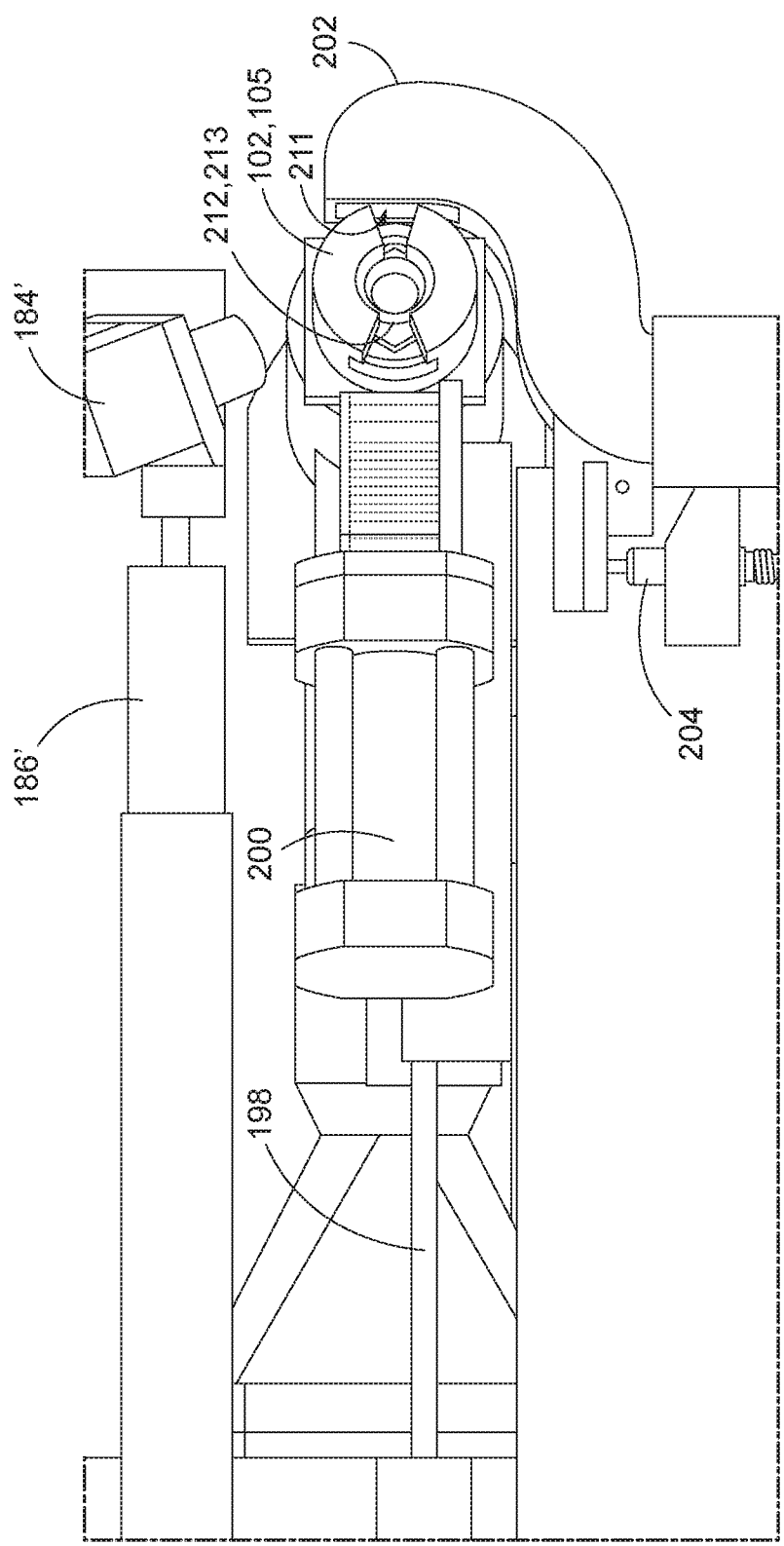
FIG. 19 is a close-up side elevation view of a portion of the end effector of the portable work module of FIGS. 15-18, illustrating movement of a catchment mechanism of the end effector, moved into position for receiving a piece of debris.
Figure 20:
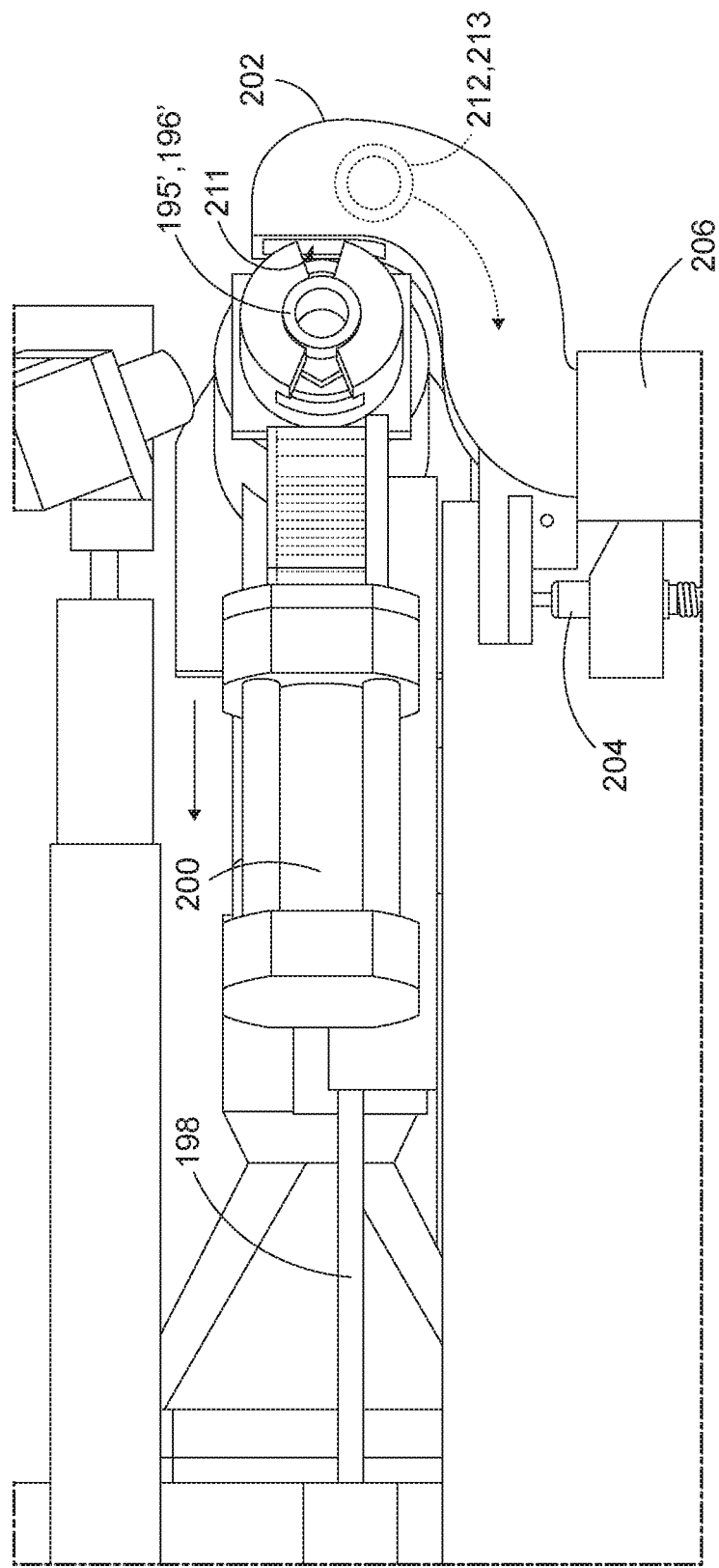
FIG. 20 is a close-up side elevation view of a portion of the end effector of the portable work module of FIGS. 15-19, illustrating placement of a new nut.

Each debris catcher 202 may include a corresponding debris catcher piston 204 configured to transition the respective debris catcher 202 between a receiving position in which debris catcher 202 is positioned to receive a piece of debris from, for example, nut-holding fingers 102 (as shown in FIGS. 14, 19, and 20) and a lowered position in which debris catcher 202 is moved away from nut-holding fingers 102 to avoid interfering with movement of nut-holding fingers 102 (as shown in FIGS. 13, 18, 21, and 22). In some examples, each debris catcher 202 may be configured to deliver received debris to a respective debris cartridge or debris storage container 206, said debris cartridge 206 being configured to contain a plurality of pieces of debris. In some examples, debris catcher 202 is operatively coupled to debris cartridge 206 when debris catcher 202 is in the receiving position, and disconnected from debris cartridge 206 when debris catcher 202 is in the lowered position. In some examples, debris catcher 202 delivers received debris to debris cartridge 206 via gravity. Additionally or alternatively, debris cartridge 206 may be configured to move received debris away from debris catchers 202 and/or towards insert 54. For example, debris cartridges 206 may extend longitudinally along telescoping arm 52, such as adjacent (e.g., parallel to, near, next to, above, and/or under) nut cartridges 194.

Figure 22:
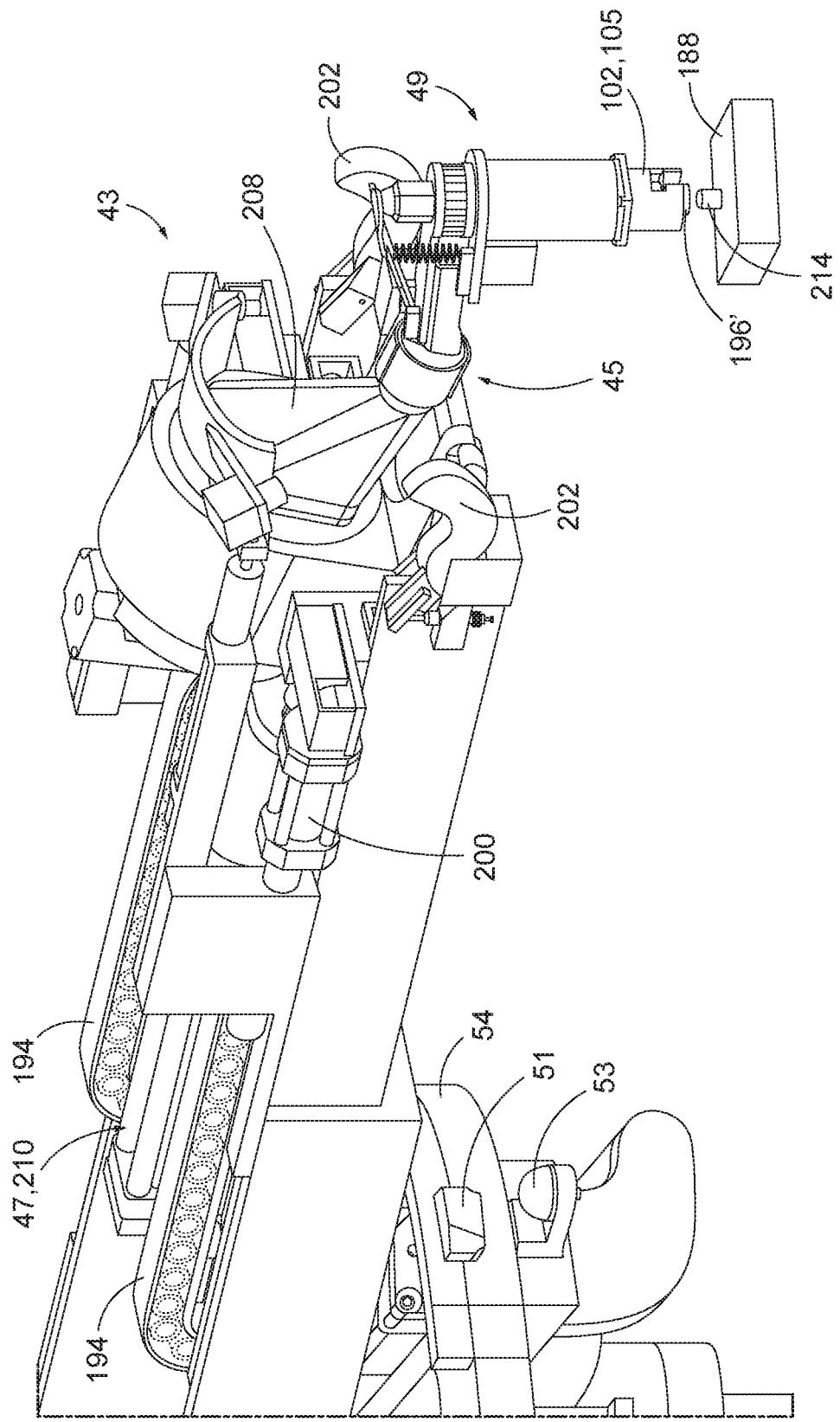
FIG. 22 is a perspective view of a portion of the portable work module of FIGS. 15-21, with the end effector positioned for placement of a new nut within the confined space.

Portable work module 166 includes a drive mechanism or structure 207, such as ratchet 208, that is configured for positioning and/or orienting end effector 49 (e.g., nut-holding fingers 102) and/or for driving end effector 49. Portable work module 166 also includes a ratchet piston 210 configured to translate and/or pivot ratchet 208. In use, end effector 49 may be positioned and/or oriented in two or more different configurations in some examples. For example, end effector 49 may be selectively transitioned between a nut reload position (FIGS. 18-20) and one or more fastener processing positions (FIGS. 21-22). FIG. 18 illustrates end effector 49 returning to the nut reload position, with nut-holding fingers 102 being drawn nearer to nut cartridges 194 via ratchet 208. FIG. 19 illustrates nut-holding fingers 102 in the nut reload position, with debris catcher 202 positioned via debris catcher piston 204 such that opening 211 of debris catcher 202 is adjacent nut-holding fingers 102. In this configuration, debris catcher 202 is positioned relative to nut-holding fingers 102 such that opening 211 of debris catcher 202 receives a piece of foreign object debris 212 from nut-holding fingers 102 when a new nut is inserted into nut-holding fingers 102 (e.g., via actuation mechanism 103). For example, as described above, foreign object debris 212 (e.g., a collar portion 213 of nut 196) that breaks away from nut 196 is retained in nut-holding fingers 102 when nut-holding fingers 102 install nut 196 and is still contained within nut-holding fingers 102 as nut-holding fingers 102 are transitioned to the nut reload position shown in FIG. 19. When nut feeder piston 198 causes a subsequent respective nut 196' (or other subsequent fastener 195') to be advanced from nut cartridge 194 and nut inserting piston 200 positions nut 196' within nut-holding fingers 102, debris 212 is forced out of nut-holding fingers 102 and into debris catcher 202 via opening 211, as shown in FIG. 20. In this manner, actuation mechanism 103 (e.g., nut feeder mechanism 104) may be configured to position a respective fastener 195 (e.g., nut 196) into debris retention structure 105 (e.g., nut-holding fingers 102) substantially simultaneously with moving each respective piece of debris into debris catcher 202. Foreign object debris 212 may then travel into debris cartridges 206, and away from nut-holding fingers 102, without entering the confined space in which portable work module 166 is performing the task, thus substantially negating the need to remove foreign object debris 212 from the confined space in a separate, subsequent step.

FIG. 21 illustrates end effector 49 being transitioned towards a fastener processing position, with cameras 184, 184' viewing target 188 within a confined space to provide feedback for positioning of nut-holding fingers 102. As shown in FIG. 21, debris catchers 202 may be pivoted away from nut-holding fingers 102 to make space for nut-holding fingers 102 to be moved towards and oriented with respect to target 188. As end effector 49 is transitioned to the desired fastener processing position (e.g., in which end effector 49 is positioned relative to a target site within the confined space such that it is positioned and oriented to perform a task at the target site), ratchet 208 may be translated via ratchet piston 210, thereby translating and/or pivoting ratchet 208 and/or end effector 49. FIG. 22 illustrates nut-holding fingers 102 in a desired fastener processing position with respect to target 188 within a confined space. Nut-holding fingers 102 hold nut 196' in an axial position with respect to, for example, a stud 214 at target 188, while nut 196' is torqued onto stud 214 via ratchet 208. After nut 196' is installed onto stud 214, ratchet piston 210 retracts ratchet 208 and nut-holding fingers 102 back towards the nut-reload position of FIGS. 19-20, for removal of debris 212 from nut-holding fingers 102 and insertion of a subsequent respective nut 196 into nut-holding fingers 102, as described above.

Thus portable work module 166 is configured to automatically load a new, subsequent nut 196 into nut-holding fingers 102 each time nut-holding fingers 102 are brought back to the nut-reload position, while simultaneously capturing and disposing of foreign object debris (e.g., the broken collar portion 213 of each nut 196) resulting from installing each nut 196. Portable work module 166 may be configured to position end effector 49 within the confined space and perform a task within the confined space via end effector 49 autonomously or semi-autonomously. Portable work module 166 thus may advantageously reduce the need for human operators to enter and perform tasks within such confined spaces, thereby reducing dangers, increasing reproducible processes, providing greater scheduling capacity, reducing bottlenecks in manufacturing, decreasing turn-around time, increasing the amount of time said manufacturing processes may be continuously operating, and/or increasing cost savings. Positioning and orientation of end effector 49 within a confined space may be simplified by virtue of insert 54 of portable work module 166 being positioned at a known reference position (e.g., the access port to the confined space) and at least substantially stationary with respect to that known reference position. The access port to the confined space thus may be used as a point of reference for determining the position of end effector 49 with the confined space, with respect to the confined space.

In the example shown, end effector 49 includes just one set of nut-holding fingers 102 that is used for each of the two nut cartridges 194 (e.g., nut-holding fingers 102 may be rotated from one nut cartridge 194 to the other, alternating which cartridge each subsequent nut 196 is received from, or nut holding fingers 102 may receive nuts 196 from one nut cartridge 194 until that cartridge is empty, and then be rotated to receive nuts 196 from the other nut cartridge 194). However, in other examples, end effector 49 may include a respective set of nut-holding fingers 102 for each respective nut cartridge 194. In yet other examples, a single set of nut-holding fingers 102 may receive nuts 196 (or other fasteners or components) from more than two storage cartridges.

While portable work module 166 is illustrated with two nut cartridges 194, two nut feeder pistons 198, two nut inserting pistons 200, two debris catchers 202, two debris catcher pistons 204, and two debris cartridges 206, other examples of portable work module 166 may include more or fewer of one or more of these components. Nut feeder pistons 198, nut inserting pistons 200, debris catcher pistons 204, camera extend pistons 186, ratchet piston 210 may be pneumatically, hydraulically, and/or electrically actuated in various examples of portable work module 166.

While portable work module 166 is shown and described with end effector 49 in the form of a nut driving tool, in other examples, portable work module 166 may include one or more different tools, such as a swage gun, a cleaning tool, a sealant tool, a drill, grippers, an installation tool, a coating or painting tool, a welding tool, a camera or vision tool, a sensor, a material removal tool, and/or any other desired tool or attachment. Similarly, while portable work module 166 is described in the context of a nut driving tool 100, in other examples, portable work module 166 may be configured to reload different subsequent fastening components other than nuts 196 into end effector 49 and further to substantially simultaneously remove a different piece of foreign object debris from end effector 49 at each reload. In some examples, portable work module 166 may be modular and/or customizable such that end effector 49 may be selectively removed and replaced with one or more different tools operable with the same revolute joints 45 and prismatic joints 47 of portable work module 166. The combination of revolute joints 45 and prismatic joints 47 may facilitate compaction of portable work module 166 for entry into a confined space, yet allowing for articulation of end effector 49 within confined space 17. In some examples, portable work module 166 may be configured to reach any target site within a given confined space with end effector 49.

Figure 23:
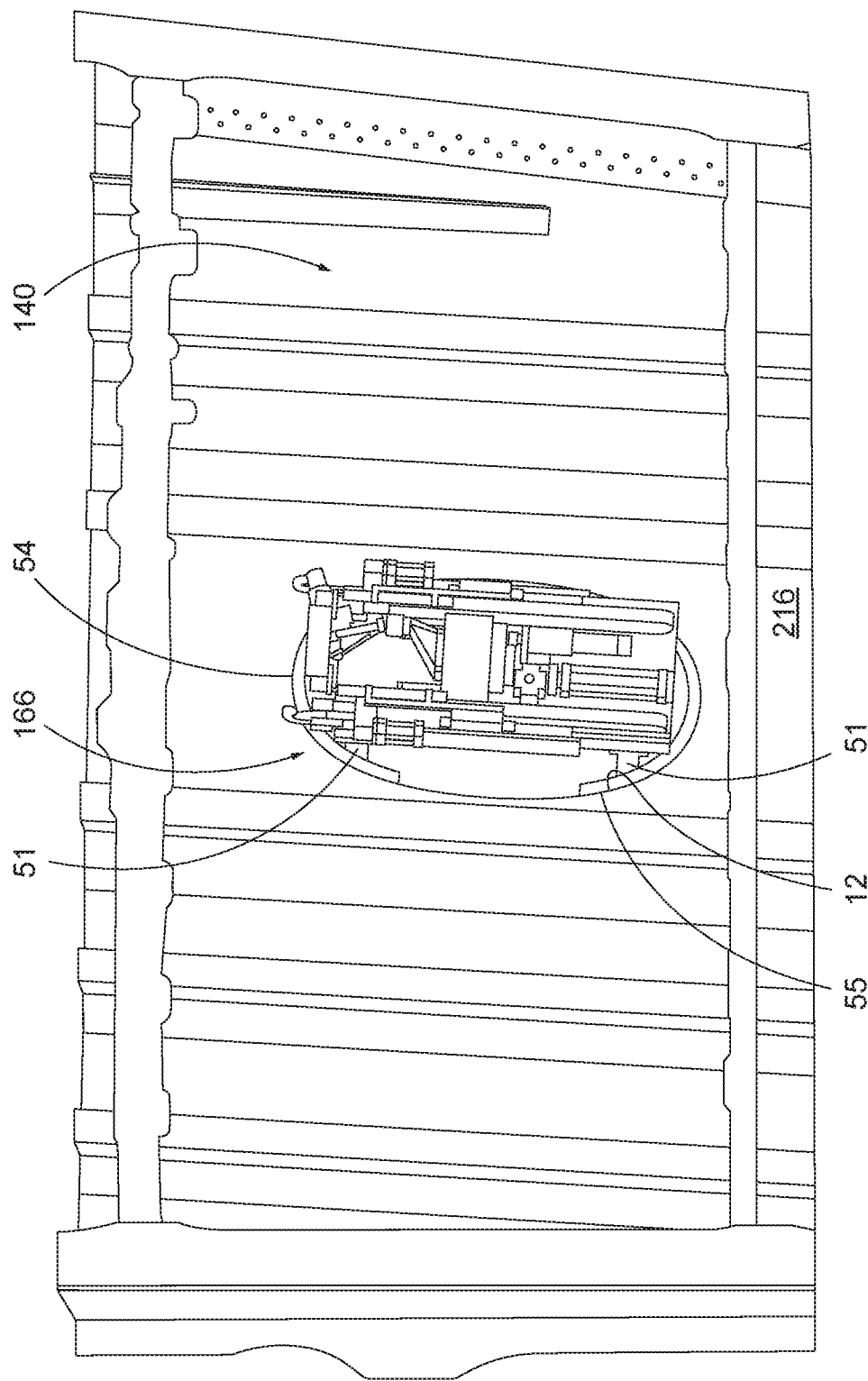
FIG. 23 is a top plan view of a portable work module according to the present disclosure in a retracted configuration and positioned within a confined space, with an insert positioned within the access port to the confined space.
Figure 24:
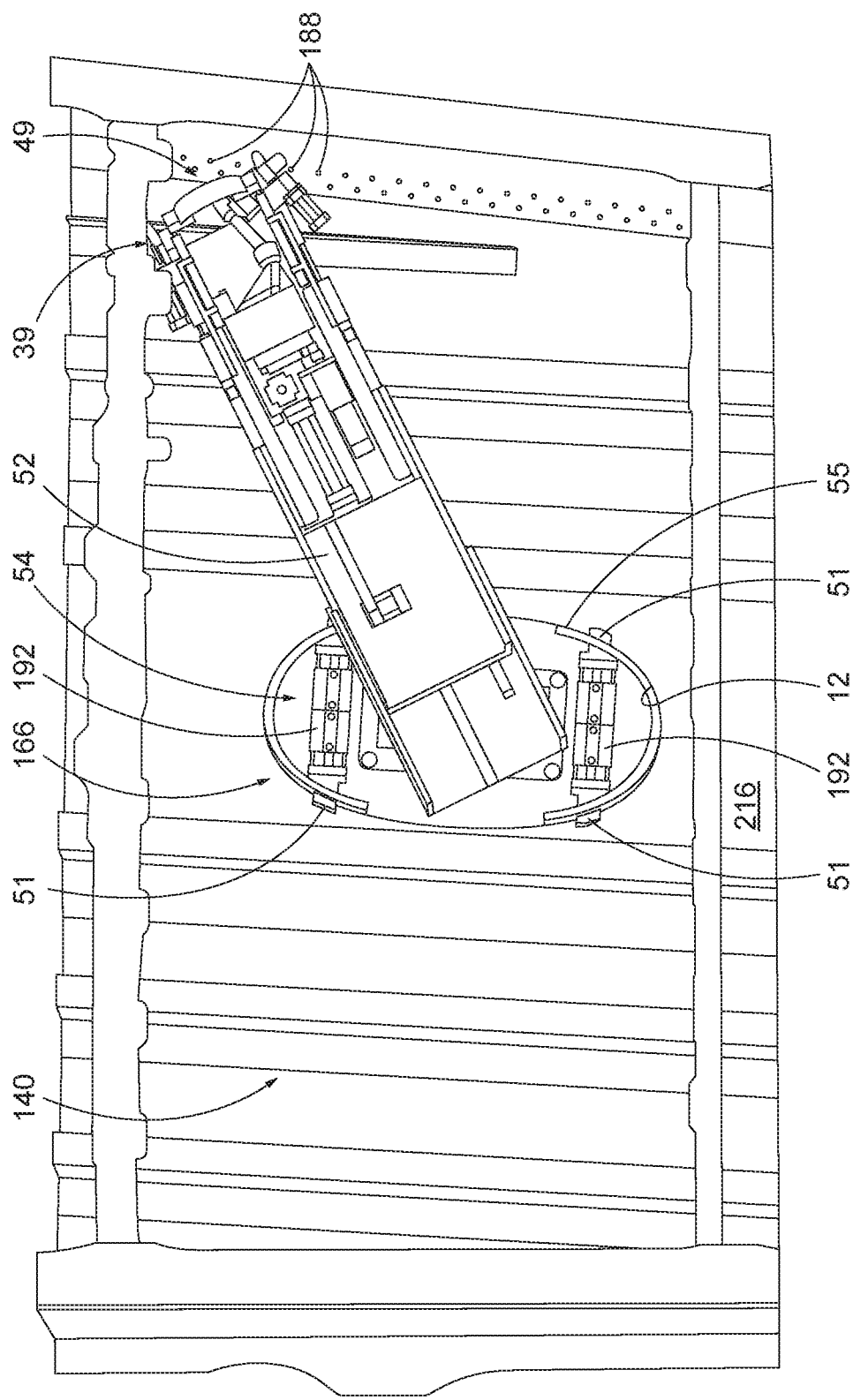
FIG. 24 is a top plan view of the portable work module of FIG. 23, with the insert secured with respect to the access port, with the portable work module being in an extended configuration and the robotic end effector of the portable work module performing a task within the confined space.

FIGS. 23-24 illustrate a top plan view of portable work module 166 being deployed within a confined space of a wingbox. Access port 12 provides access to wing cavity 140 of an aircraft wing. In FIG. 23, portable work module 166 is being inserted through access port 12. Portable work module 166 is thus in a compacted configuration, having a footprint no larger than that of insert 54. As shown in FIG. 23, locator locks 51 are retracted such that they do not extend radially beyond peripheral surface 55 of insert 54. In FIG. 24, portable work module 166 is shown performing a task within wing cavity 140. As shown, locator locks 51 are engaged with an interior surface 216 of wing cavity 140, with locator locks 51 extending radially beyond peripheral surface 55 of insert 54 (e.g., via activation of locking cylinders 192). Insert 54 has a size and shape that is substantially similar to that of the opening of access port 12, such that insert 54 may be configured to fit within access port 12. In some examples, insert 54 may have a friction fit with access port 12. In other examples, insert 54 may be free to move axially with respect to access port 12, yet still be stationary with respect to access port 12 (e.g., due to locator locks 51 and/or locator stops on the opposite surface of the wing), such that portable work module 166 is configured to use its location at access port 12 as a reference location for knowing its position within wing cavity 140.

FIG. 24 shows portable work module 166 in an extended configuration, with distal end region 39 of telescoping arm 52 (or other prismatic joint 47) extended away from insert 54 and access port 12. In this manner, portable work module 166 may position end effector 49 (which may be coupled to telescoping arm 52 within distal end region 39 of telescoping arm 52) at one or more target sites 188 within the confined space of wing cavity 140. As end effector 49 of portable work module 166 performs each task at each respective target location 188, portable work module 166 is configured to move end effector 49 to the next respective target location 188 to perform the task again. Portable work module 166 may be returned to the compacted configuration shown in FIG. 23 for removal from wing cavity 140 when it is desired to remove portable work module 166 from wing cavity 140 (e.g., when end effector 49 has completed all desired tasks within wing cavity 140). As shown in FIG. 24, the combination of joints of portable work module 166 and/or of end effector 49 may enable end effector 49 of portable work module 166 to reach substantially all areas or locations within wing cavity 140, in some examples.

Figure 25:
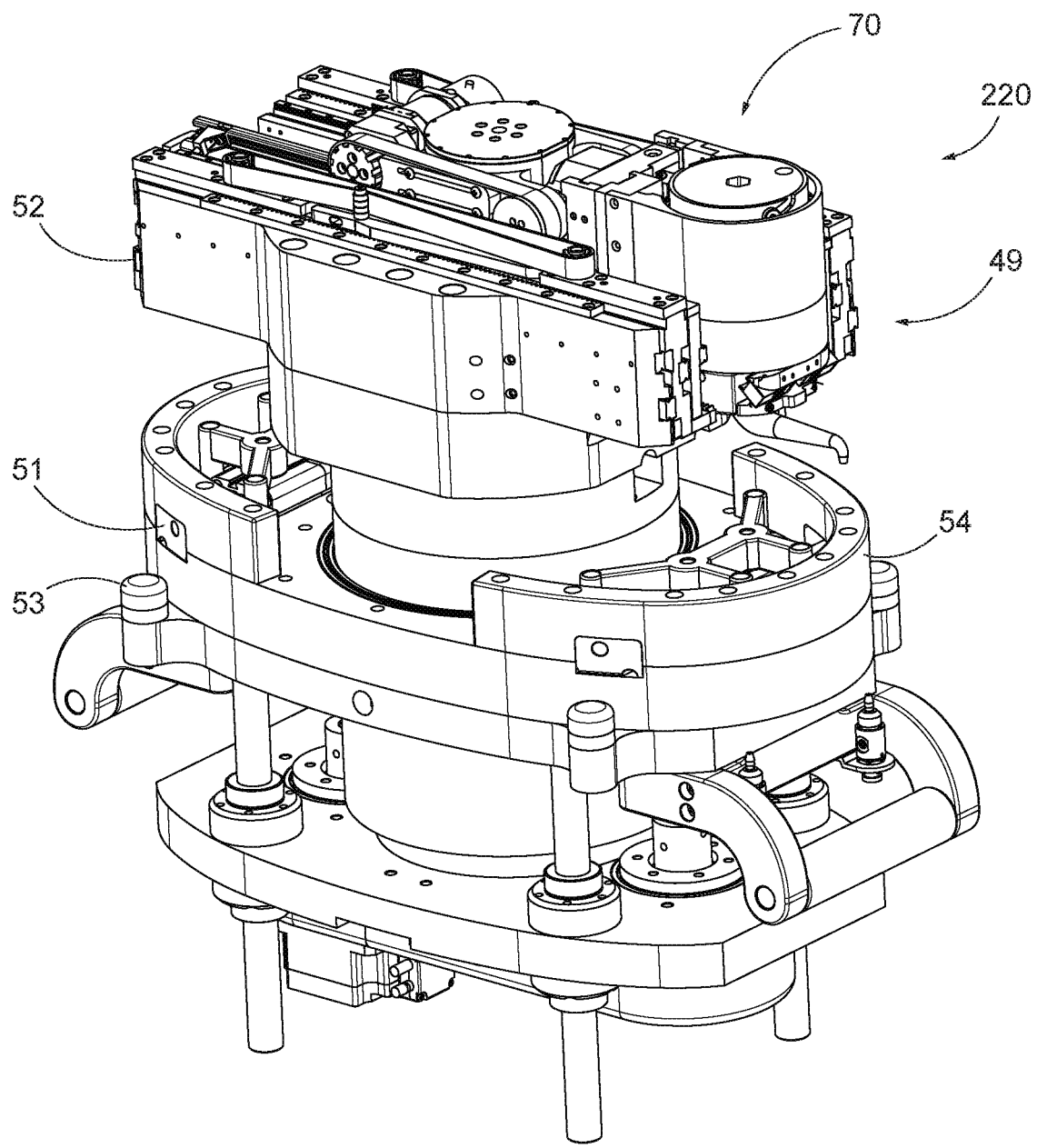
FIG. 25 is a perspective view of another example of a portable work module according to the present disclosure, in a retracted configuration.
Figure 26:
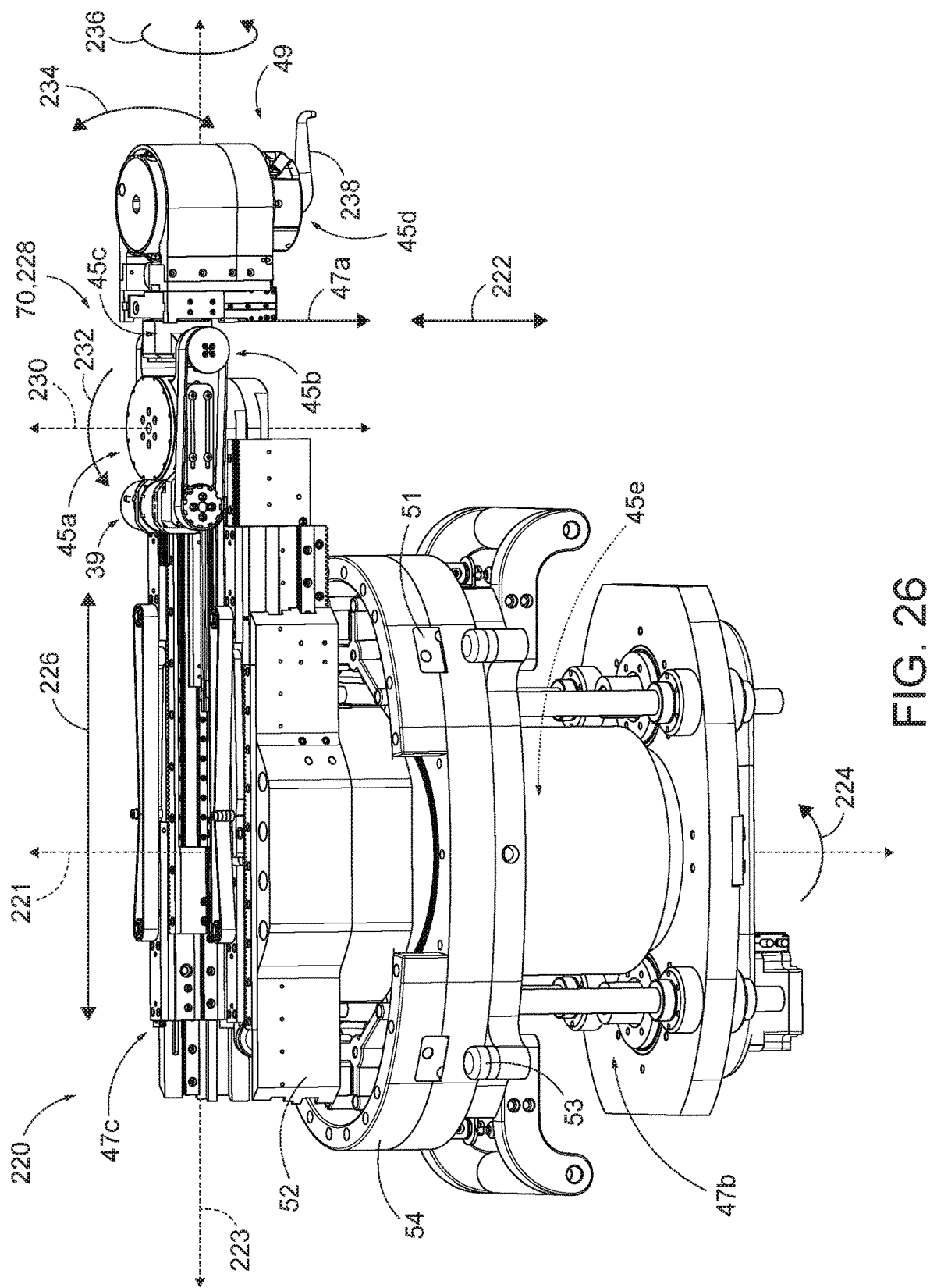
FIG. 26 is a perspective view of the portable work module of FIG. 25, in a partially extended configuration.
Figure 27:
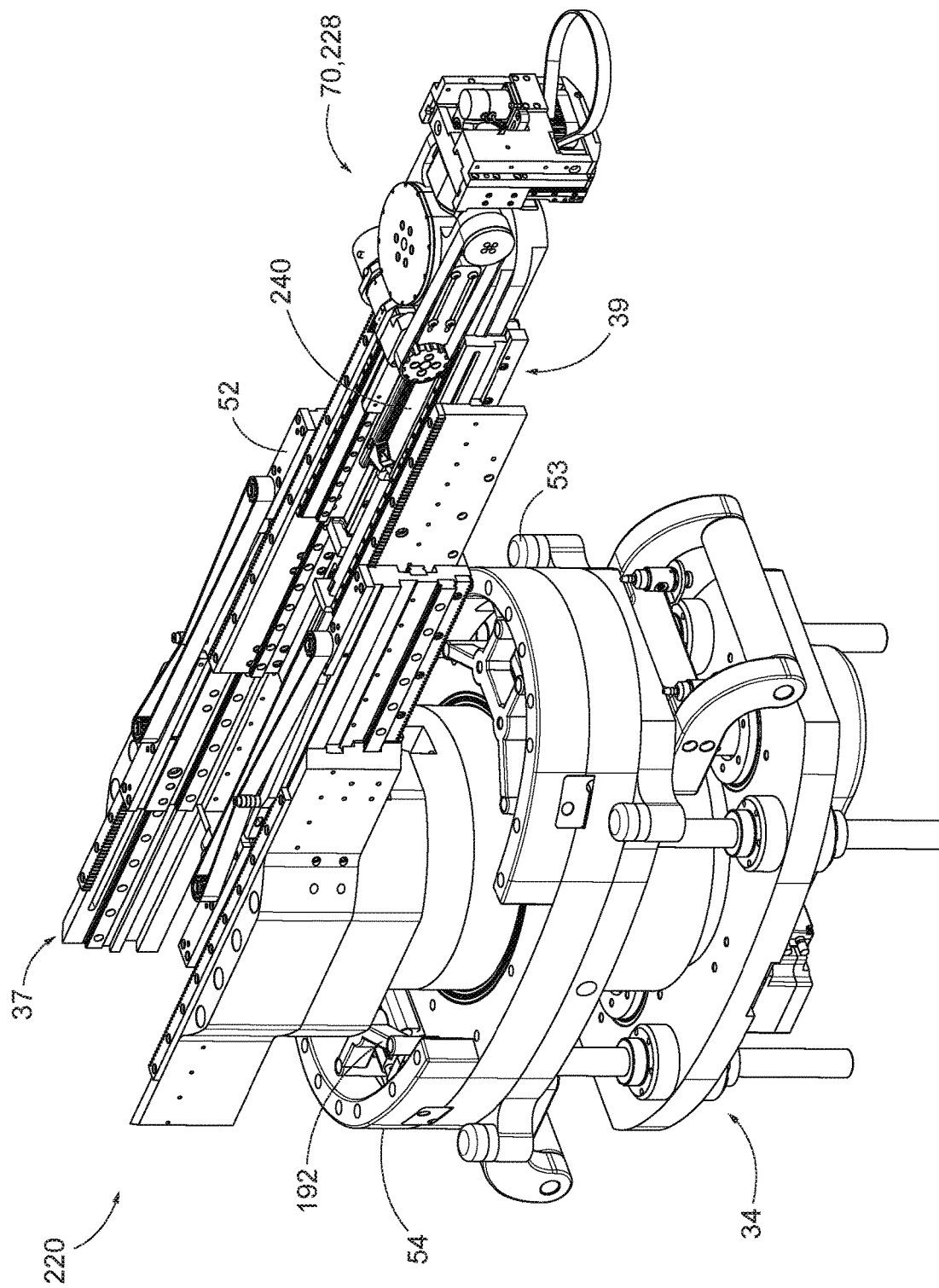
FIG. 27 is a perspective view of the portable work module of FIGS. 25-26 in a fully extended configuration.

FIGS. 25-27 illustrate another example of portable work module 50, in the form of portable work module 220. Portable work module 220 includes a prismatic joint 47 in the form of telescoping arm 52, which is shown compacted, or retracted, in FIG. 25, to be inserted through an access port of a confined space. FIG. 26 illustrates portable work module 220 with telescoping arm 52 partially extended. Wrist 70, which may include one or more revolute joints 45, is coupled to telescoping arm 52 for positioning and orienting end effector 49 within a confined space and with respect to telescoping arm 52. Similar to other examples described herein, portable work module 220 includes insert 54 for positioning at least partially within an access port, which may serve as a reference location for portable work module 220 (e.g., for positioning end effector 49), in use. FIG. 27 illustrates portable work module 220 without end effector 49, with telescoping arm 52 in a more fully extended configuration.

Portable work module 220 is configured to have eight degrees of freedom, as indicated in FIG. 26. A wrist 228 (which is an example of wrist 70) is positioned within distal end region 39 of telescoping arm 52 and includes a plurality of other joints configured for fine adjustment of the position and orientation of end effector 49 with respect to telescoping arm 52 (and insert 54 and base 34), within a confined space. For example, as shown in FIG. 26, wrist 228 includes a first revolute joint 45*a* configured for rotation (yaw) of end effector 49 about a vertical axis 230, as indicated by arrow 232. First revolute joint 45*a* is configured to rotate end effector 49 as described, with respect to telescoping arm 52. Wrist 228 additionally includes a second revolute joint 45*b* configured for rotation (pitch) of end effector 49 with respect to telescoping arm 52, as indicated by arrow 234. Wrist 228 also includes a third revolute joint 45*c* configured for rotation (roll) of end effector 49 about a longitudinal axis (e.g., X-axis 223), as indicated by arrow 236. In other words, wrist 228 may include a plurality of revolute joints 45, examples of which include first revolute joint 45*a*, second revolute joint 45*b*, and third revolute joint 45*c*. Additionally or alternatively, wrist 70 may include one or more additional prismatic and/or revolute joints 47, 45 configured to provide additional or alternative degrees of freedom. For example, wrist 228 includes a first prismatic (e.g., linear) joint 47*a* (which is an example of prismatic joint 47) configured for vertical translation of end effector 49 with respect to telescoping arm 52 (in the directions indicated by arrow 222). In some examples, end effector 49 of portable work module 220 includes an additional revolute joint (e.g., fourth revolute joint 45d, which is an example of revolute joint 45), such as for rotation (yaw) of a portion of end effector 49. For example, a nozzle 238 may be configured to rotate with respect to the remainder of end effector 49, in addition to the other degrees of freedom of the overall end effector 49 with respect to telescoping arm 52.

Portable work module 220 may be selectively raised and lowered with respect to a base (e.g., base 34) along a Z-axis 221 (e.g., portable work module 220 is configured to be translated with respect to base 34 in the directions indicated by arrow 222), such as via a second prismatic joint 47b (which is an example of prismatic joint 47). Portable work module 220 (e.g., telescoping arm 52 and end effector 49) may be selectively rotated about Z-axis 221 with respect to base 34 (and insert 54), as indicated by arrow 224, thereby providing a yaw rotation of telescoping arm 52 together with end effector 49, such as via a fifth revolute joint 45e (which is an example of revolute joint 45). Telescoping arm 52 (e.g., distal end region 39 of telescoping arm 52) is configured to selectively extend away from and contract towards base 34 in the directions indicated by arrow 226, thereby translating end effector 49 towards and away from insert 54 along an X-axis 223, such as via a third prismatic joint 47c (which is an example of prismatic joint 47). These three degrees of freedom may be configured for coarse adjustment and positioning of end effector 49 within a confined space, and may be used in conjunction with the fine positioning of the revolute and prismatic joints 45, 47 of wrist 228.

In some examples, portable work module 220 includes an air cylinder 240 or other actuator configured to provide extra extension of telescoping arm 52, end effector 49, and/or wrist 228 with respect to base 34 (FIG. 27). In some examples, air cylinder 240 may be configured to provide extra extension of wrist 228, or wrist 70, with respect to telescoping arm 52. Some examples of portable work module 220 include one or more control valves 242, which may be air directional control valves 242, configured to control one or more locking cylinders 192 for securing insert 54 with respect to an access port of a confined space, thereby providing a reference location for portable work module 220. In some specific examples, portable work module 220 includes redundant control valves 242. For example, portable work module 220 may include two respective control valves 242 configured to secure (e.g., lock) the position of insert 54 of portable work module 220 with respect to the access port, and two different respective control valves 242 configured to disengage (e.g., unlock) insert 54 with respect to the access port, for removal of portable work module 220 from the confined space in which it is performing one or more tasks.

Figure 28:
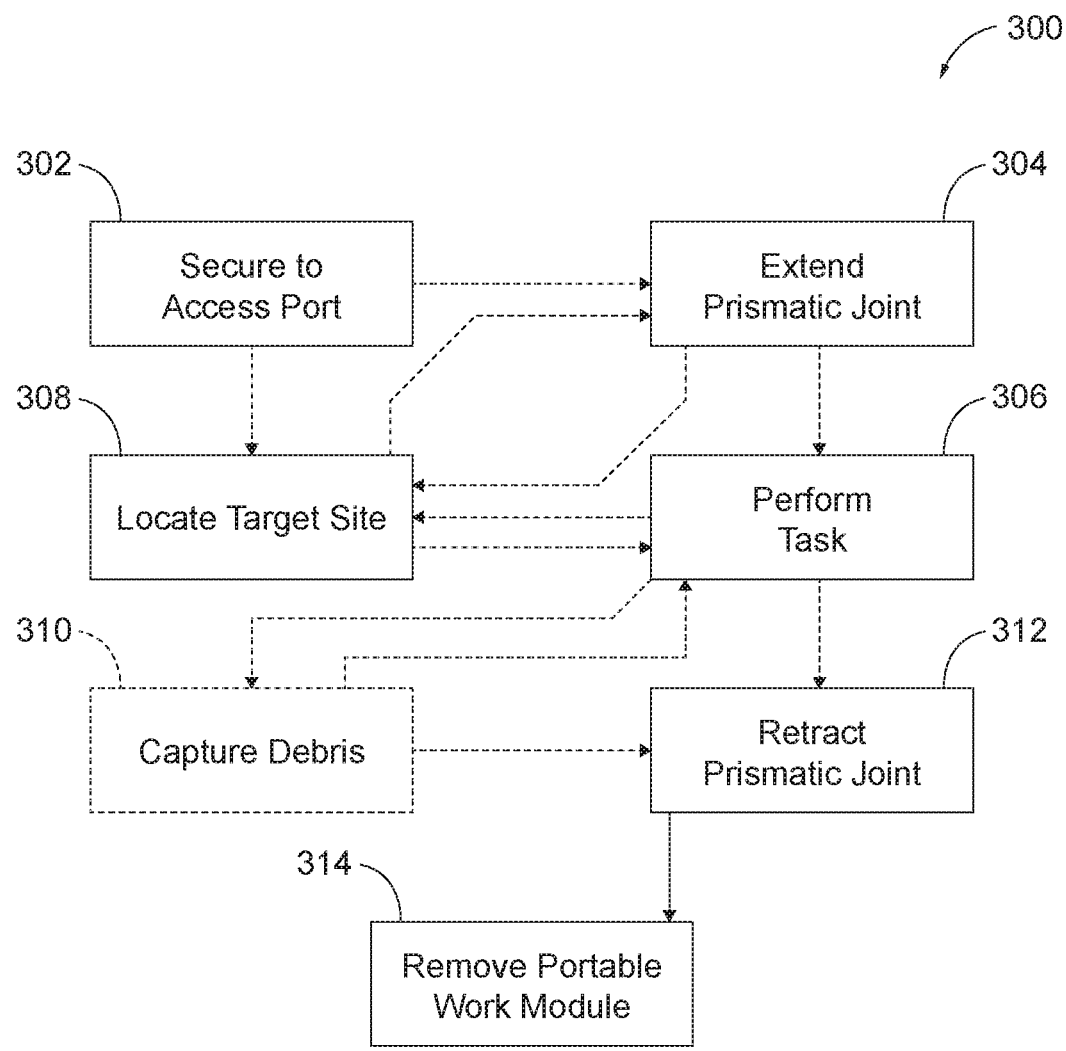
FIG. 28 is a schematic flow-chart diagram of methods of performing a task within a confined space according to the present disclosure.
Figure 29:
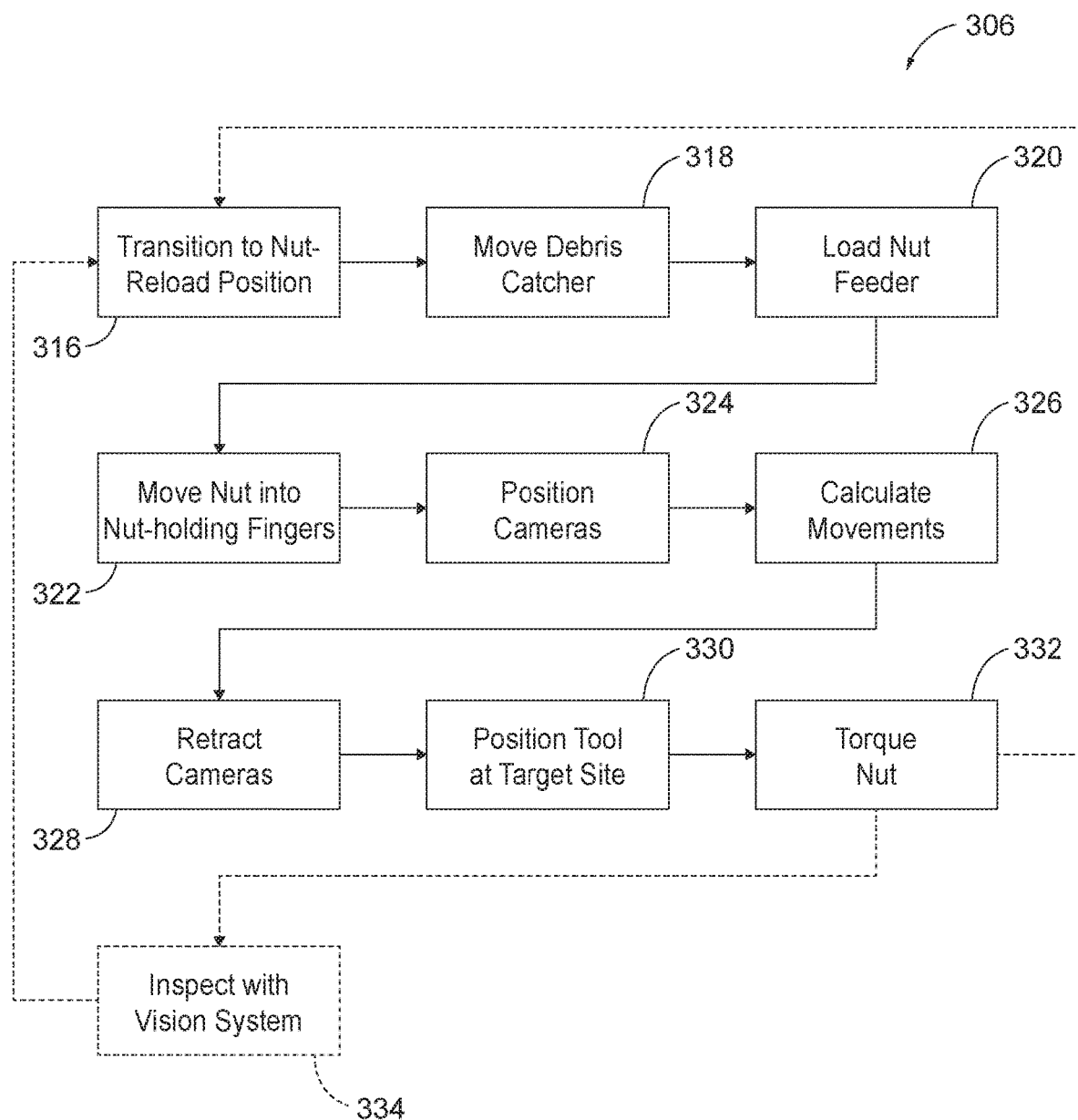
FIG. 29 is a schematic flow-chart diagram of methods of securing a nut within a confined space via portable work modules according to the present disclosure.

FIGS. 28-29 schematically provide flowcharts that represent illustrative, non-exclusive examples of methods according to the present disclosure. In FIGS. 28-29, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 28-29 are not limiting and other methods and steps are within the scope of the present disclosure, including methods having greater than or fewer than the number of steps illustrated, as understood from the discussions herein.

FIG. 28 illustrates methods 300 of performing a task within a confined space (e.g., confined space 17) using one or more portable work modules (e.g., portable work module 28) according to the present disclosure. In use, a portion of the portable work module (e.g., insert 54) is secured with respect to an access port (e.g., access port 12) of the confined space, such as by securing the insert of the portable work module with respect to the access port at 302. In some examples, securing the portable work module at 302 may include activating one or more locking cylinders (e.g., locking cylinders 192), thereby engaging one or more locator locks (e.g., locator locks 51) with respect to the access port. A prismatic joint of the portable work module (e.g., telescoping arm 52) may be extended away from the insert at 304 to a position within the confined space where an end effector (e.g., end effector 49) of the portable work module performs one or more tasks at 306. Before or after extending the prismatic joint at 304, a target site within the confined space may be located at 308. For example, the location of a target site where a task is to be performed may be calculated based on the reference location of the access port of the confined space, in some examples. Additionally or alternatively, locating the target site at 308 may include using a vision system (e.g., vision system 43) of the portable work module to locate a desired target site, such as stud location, a bore for receiving a fastener, or other location within the confined space. Performing one or more tasks at 306 may include performing any desired task within the confined space, such as swaging, cleaning, applying sealants, paints, or other coatings, driving nuts or other components, moving and/or removing objects, gripping, installing one or more fasteners or other components, welding, sensing, monitoring, and/or vision-related tasks.

Some methods 300 include capturing and/or removing foreign object debris at 310. For example, in examples where performing the task at 306 includes installing a frangible nut (e.g., nut 196) having a collar portion (e.g., collar portion 213) that breaks off from the nut during installation, capturing and/or removing foreign object debris at 310 may include capturing the collar portion (e.g., in debris catcher 202) and removing it from the tool of the portable work module, thereby ensuring that the foreign object debris is not loosed within the confined space. In some methods 300, the portable work module is configured to perform a plurality of different tasks at 306. In some methods 300, the portable work module is configured to perform the same task a plurality of times at 306. For example, the portable work module may be configured to install a plurality of fasteners within the confined space at 306, in some cases locating the next installation site at 308 between each instance of performing the task at 306. After the portable work module has performed the desired task or tasks at 306, the portable work module may be compacted at 312, such as by retracting the telescoping arm or other prismatic joint to reduce the overall footprint of the portable work module to a retracted configuration. The portable work module and associated insert may then be removed from the confined space at 314. For example, removing the portable work module at 314 may include deactivating the locking cylinders, thereby releasing or disengaging one or more locator locks of the insert, and then withdrawing the insert and end effector through the access port of the confined space. Steps of methods 300 may be performed autonomously or semi-autonomously in some examples.

FIG. 29 illustrates one specific example of a method of performing a task 306 within a confined space, such as installing a plurality of frangible nuts within a confined space. The method of FIG. 29 is described sequentially, for clarity, though steps may be performed in a plurality of different orders other than described herein. An end effector, or tool, of the portable work module, such as nut-holding fingers (e.g., nut-holding fingers 102) is transitioned to a nut-reload configuration at 316 (such as the position shown in FIG. 19). As the tool is moved to the nut-reload configuration at 316, or after the tool is moved to the nut-reload configuration at 316, one or more debris catchers are moved into position at 318 to receive debris from the tool. For example, debris catcher pistons (e.g., debris catcher pistons 204) may be configured to move the debris catchers such that an opening of the respective debris catcher in use faces and is adjacent the nut-holding fingers. A nut feeder is loaded with a respective nut at 320. For example, a nut feeder piston (e.g., nut feeder piston 198) may move a respective nut from a nut cartridge (e.g., nut cartridge 194) for insertion into the nut-holding fingers. A nut inserting piston (e.g., nut inserting piston 200) then inserts the nut into the nut-holding fingers at 322, thereby simultaneously pushing debris previously retained within the nut-holding fingers (e.g., debris 212) into the debris catcher positioned to receive said debris (FIG. 20).

One or more cameras (e.g., cameras 184) are deployed at 324 to locate the target site for performing the task within the confined space (FIG. 21). Fine movements of the end effector and/or wrist (e.g., wrist 70) of the portable work module are calculated at 326 and the cameras are retracted at 328. One or more joints of the portable work module are actuated at 330 to move, orient, and/or position the nut-holding fingers over a stud or other location within the confined space. For example, moving the nut-holding fingers at 330 may include rotating one or more revolute joints and/or translating the nut-holding fingers via one or more prismatic joints. In some specific examples, moving the nut-holding fingers at 330 may include extending and/or pivoting a ratchet (e.g., ratchet 208), translating the nut-holding fingers with respect to the telescoping arm, and/or adjusting the pitch, roll, and/or yaw of the nut-holding fingers with respect to the telescoping arm.

Once the nut-holding fingers are positioned with respect to the target site (e.g., positioned such as shown in FIG. 22), the nut retained by the nut-holding fingers is installed at 332, such as by torqueing the ratchet, thereby driving the nut onto the stud within the confined space. In some examples, installing the nut at 332 includes breaking a collar portion off of the nut when a threshold torque is reached, and retaining the collar portion in the nut-holding fingers. The nut-holding fingers are then returned to the nut-reload position at 316. In some methods 300, the cameras are deployed at 334 to verify the installation of the nut (or otherwise to verify completion of the desired task) and/or to confirm the next location for the next task performance. The process may then be repeated one or more times, such as to install a plurality of respective nuts at a plurality of respective target locations within the confined space. After completion, the portable work module may be removed from the confined space, as described with respect to methods 300 of FIG. 28.

Illustrative, non-exclusive examples of inventive subject matter according to the present disclosure are described in the following enumerated paragraphs:

A1. A portable programmable machine configured to perform one or more tasks within a confined space, the portable programmable machine comprising:

a first prismatic joint comprising a telescoping arm, or a counterbalanced telescopic arm;

a base configured to support the telescoping arm, a distal end region of the telescoping arm being unsupported by the base and having an articulating wrist configured to hold and manipulate a tool for performing the one or more tasks within the confined space, wherein the distal end region of the telescoping arm is configured to be translated with respect to the base, wherein the wrist comprises a plurality of joints configured to rotate and translate the tool with respect to the telescoping arm;

a first revolute joint configured to rotate the telescoping arm; and a vision system configured to facilitate positioning of the tool and performance of the one or more tasks within the confined space;

wherein the portable programmable machine is configured to position the tool and perform the one or more tasks autonomously and/or semi-autonomously via selectively moving the telescoping arm and the wrist with respect to the base;

wherein the base includes a power source and a programmable computer configured to process numerical data and to communicate with and control movements of the telescoping arm and the wrist.

A1.1 The portable programmable machine of paragraph A1, wherein the telescoping arm is configured to extend between a compacted configuration having a first length, and an extended configuration having a second length, wherein the second length is greater than the first length.

A2. The portable programmable machine of paragraph A1 or A1.1, further comprising a vision system configured to facilitate positioning of the tool and performance of the one or more tasks within the confined space.

A3. The portable programmable machine of paragraph A2, wherein the vision system is autonomous.

A4. The portable programmable machine of paragraph A2, wherein feedback from the vision system is utilized in real-time by an operator to remotely position the tool and/or perform the one or more tasks within the confined space, via the tool.

A5. The portable programmable machine of any of paragraphs A1-A4, wherein the telescoping arm extends from a proximal end region to the distal end region, wherein the proximal end region is supported by the base, and wherein the distal end region is configured to receive, articulate, and support the tool.

A6. The portable programmable machine of any of paragraphs A1-A5, wherein the telescoping arm comprises a plurality of sections configured for progressive extension of the telescoping arm towards an/the extended configuration.

A7. The portable programmable machine of any of paragraphs A1-A6, wherein, in a/the compacted configuration, the telescoping arm has a reduced footprint and is configured to be inserted at least partially through an access port to the confined space, and wherein, in an/the extended configuration, the telescoping arm is configured to position the tool and perform the one or more tasks at a location within the confined space, spaced apart from the access port.

A8. The portable programmable machine of any of paragraphs A1-A7, wherein the base is mobile with respect to the confined space.

A9. The portable programmable machine of any of paragraphs A1-A8, wherein the plurality of joints of the wrist comprises a first revolute joint configured to adjust the yaw of the tool with respect to the telescoping arm.

A10. The portable programmable machine of any of paragraphs A1-A9, wherein the plurality of joints of the wrist comprises a second revolute joint configured to adjust the pitch of the tool with respect to the telescoping arm.

A11. The portable programmable machine of any of paragraphs A1-A10, wherein the plurality of joints of the wrist comprises a third revolute joint configured to adjust the roll of the tool with respect to the telescoping arm.

A12. The portable programmable machine of any of paragraphs A1-A11, wherein the plurality of joints of the wrist comprises a second prismatic joint configured to translate the tool with respect to the telescoping arm.

A13. The portable programmable machine of any of paragraphs A1-A12, wherein the portable programmable machine comprises a fourth revolute joint configured to rotate the tool with respect to the wrist.

A14. The portable programmable machine of any of paragraphs A1-A13, wherein the combination of the first prismatic joint, the first revolute joint, and the plurality of joints of the wrist is configured to provide at least eight degrees of freedom for articulation and movement of the tool within the confined space.

A14.1. The portable programmable machine of any of paragraphs A1-A14, further comprising an air cylinder configured to add extra extension to the wrist relative to the first prismatic joint.

A15. The portable programmable machine of any of paragraphs A1-A14.1, wherein the telescoping arm extends from a proximal end region to the distal end region, wherein the proximal end region is supported by the base, and wherein the distal end region is configured to receive, articulate, and support the tool, wherein the telescoping arm is configured to extend between a/the compacted configuration having a first length, and an/the extended configuration having a second length, wherein the second length is greater than the first length, wherein, in the compacted configuration, the telescoping arm has a reduced footprint and is configured to be inserted at least partially through an/the access port to the confined space, and wherein, in the extended configuration, the telescoping arm is configured to position the tool and perform the one or more tasks at a location within the confined space with the tool, spaced apart from the access port.

A16. The portable programmable machine of any of paragraphs A1-A15, further comprising an insert that is configured to be selectively secured with respect to an/the access port while the tool performs one or more tasks within the confined space, wherein the insert is configured to remain substantially stationary with respect to the access port while the insert is secured with respect to the access port, wherein the telescoping arm is configured to be rotated and translated with respect to the insert via the first prismatic joint and the first revolute joint, and wherein the portable programmable machine is configured to utilize the access port as a reference location for determining positions within the confined space.

B1. A portable work module configured to perform one or more tasks within a confined space, the portable work module comprising:
 a prismatic joint;
 a revolute joint integrated with the prismatic joint; and
 an end effector for performing the one or more tasks within the confined space, wherein the prismatic joint and the revolute joint are configured to articulate and position the end effector within the confined space, in order to perform the one or more tasks within the confined space.

B2. The portable work module of paragraph B1, wherein the prismatic joint comprises a plurality of prismatic joints.

B3. The portable work module of paragraph B1 or B2, wherein the revolute joint comprises a plurality of revolute joints.

B4. The portable work module of any of paragraphs B1-B3, wherein the portable work module is configured to be positioned at least partially within the confined space when the end effector performs the one or more tasks within the confined space.

B5. The portable work module of any of paragraphs B1-B4, wherein the portable work module is configured to maintain a respective orientation of the end effector while the end effector is moved and positioned within the confined space.

B6. The portable work module of any of paragraphs B1-B5, wherein the prismatic joint comprises a telescoping arm that is configured to extend and retract within the confined space.

B7. The portable work module of any of paragraphs B1-B6, wherein the end effector is coupled within a distal end region of the prismatic joint, wherein the distal end region is configured to extend and retract with respect to an opposite proximal end region, thereby transitioning the prismatic joint between an extended configuration and a retracted configuration, respectively.

B8. The portable work module of any of paragraphs B1-B7, wherein the portable work module is configured to be positioned at least partially within the confined space by being inserted at least partially through an access port of the confined space.

B9. The portable work module of any of paragraphs B1-B8, wherein the end effector comprises an insert that is configured to be selectively secured with respect to an/the access port of the confined space while the end effector performs one or more tasks within the confined space.

B9.1. The portable work module of paragraph B9, wherein the insert is configured to remain substantially stationary with respect to the access port while the insert is secured with respect to the access port.

B10. The portable work module of paragraph B9 or B9.1, wherein the insert is shaped and sized relative to the access port such that the access port is configured to serve as a reference location for determining the position of the end effector within the confined space.

B11. The portable work module of any of paragraphs B9-B10, wherein the insert comprises one or more engagement features that are configured to substantially prevent movement of the insert with respect to the access port when the insert is engaged with respect to the access port.

B12. The portable work module of paragraph B11, wherein the one or more engagement features comprise one or more locator locks that extend radially outward beyond a peripheral surface of the insert.

B13. The portable work module of paragraph B12, wherein the one or more locator locks are configured to engage an interior surface of the confined space.

B14. The portable work module of any of paragraphs B11-B13, wherein the one or more engagement features comprise one or more locator stops that are configured to engage an exterior surface of the confined space, thereby limiting axial movement of the portable work module with respect to the access port.

B15. The portable work module of any of paragraphs B9-B14, wherein the insert is configured to be selectively removed from an/the access port after the end effector performs one or more tasks within the confined space, thereby facilitating removal of the portable work module from the confined space.

B16. The portable work module of any of paragraphs B1-B15, wherein the portable work module is configured to selectively transition between an/the extended configuration and a/the compacted configuration, wherein, in the compacted configuration, the portable work module is configured to be inserted through an/the access port of the confined space, and wherein, in the extended configuration, the end effector is configured to perform a task within the confined space, located spaced apart from the insert.

B17. The portable work module of any of paragraphs B1-B16, wherein the prismatic joint comprises a plurality of sections configured for progressive extension of the prismatic joint towards an/the extended configuration.

B18. The portable work module of any of paragraphs B1-B17, wherein the end effector is configured to perform a plurality of tasks within the confined space, wherein each respective task of the plurality of tasks is performed in a different respective target site of the confined space.

B19. The portable work module of any of paragraphs B1-B18, wherein the portable work module is configured to provide at least six degrees of freedom for the end effector and/or at least eight degrees of freedom for the end effector.

B20. The portable work module of any of paragraphs B1-B19, further comprising a vision system configured to inspect a/the target site within the confined space after a task is performed at the target site and/or configured to locate the target site within the confined space.

B21. The portable work module of paragraph B20, wherein the vision system is manually operated.

B22. The portable work module of paragraph B20, wherein the vision system is autonomous or semi-autonomous.

B22.1. The portable work module of any of paragraphs B20-B22, wherein the vision system comprises one or more cameras configured to be extended and retracted with respect to the end effector.

B22.2. The portable work module of any of paragraphs B20-B22.1, wherein the vision system is configured to view the target site within the confined space from at least two different angles.

B22.3. The portable work module of any of paragraphs B20-B22.2, wherein the vision system comprises a respective camera extend piston for each respective camera of the vision system, wherein each respective camera extend piston is configured to translate a respective camera with respect to the prismatic joint.

B22.4. The portable work module of any of paragraphs B20-B22.3, wherein the vision system is positioned with respect to the end effector to minimize the footprint of the portable work module.

B23. The portable work module of any of paragraphs B1-B22.4, wherein the end effector comprises a plurality of end effectors coupled within the distal end region of the prismatic joint.

B24. The portable work module of any of paragraphs B1-B23, wherein the prismatic joint comprises a telescoping arm, wherein the revolute joint comprises a wrist having a plurality of revolute joints, and wherein the wrist is configured to articulate the end effector with respect to the telescoping arm.

B25. The portable work module of paragraph B24, wherein the wrist is configured to translate, rotate, and/or pivot the end effector with respect to the telescoping arm.

B25.1. The portable work module of paragraph B24 or B25, wherein the wrist is configured to adjust the roll, pitch, and/or yaw of the end effector with respect to the telescoping arm.

B25.2. The portable work module of any of paragraphs B24-B25.1, further comprising an air cylinder configured provide extra extension of the wrist with respect to the telescoping arm.

B26. The portable work module of any of paragraphs B24-B25.2, wherein the prismatic joint further comprises one or more additional prismatic joints.

B27. The portable work module of paragraph B26, wherein the wrist comprises the one or more additional prismatic joints.

B28. The portable work module of any of paragraphs B1-B27, wherein the prismatic joint comprises a/the telescoping arm, and wherein the telescoping arm is configured to be rotated and/or translated with respect to an/the insert configured to engage an/the access port configured to provide access to the confined space.

B29. The portable work module of any of paragraphs B1-B28, wherein the end effector comprises one or more swage guns, cleaning tools, sealant tools, nut driving tools, drills, grippers, installation tools, coating or painting tools, welding tools, camera or vision tools, sensors, material removal tools, and/or any other desired tool or attachment.

B30. The portable work module of any of paragraphs B1-B29, further comprising at least one nut cartridge configured to store a plurality of nuts for installation within the confined space by the end effector.

B31. The portable work module of paragraph B30, wherein the plurality of nuts comprise frangible nuts that are configured such that a respective collar portion of each respective nut breaks off from the nut when the nut is installed.

B32. The portable work module of paragraph B31, wherein the end effector is configured to retain the collar portion after installation of the respective nut, and wherein the end effector is configured to remove the collar portion from the confined space.

B33. The portable work module of any of paragraphs B1-B32, wherein the end effector is configured to install a plurality of respective components, one at a time, within the confined space, and wherein the end effector is further configured to retain a respective piece of debris resulting from each respective installation of the component.

B34. The portable work module of paragraph B33, wherein the end effector is configured such that a respective component is reloaded into the end effector after each respective installation of the previous respective component.

B35. The portable work module of paragraph B34, wherein the end effector is configured such that the respective piece of debris retained in the end effector after each respective component installation is removed substantially simultaneously with each respective component that is reloaded into the end effector.

B36. The portable work module of any of paragraphs B1-B35, further comprising one or more debris catchers, wherein the one or more debris catchers are configured to receive a/the piece of debris from the end effector and remove the piece of debris from the confined space.

B37. The portable work module of paragraph B36, wherein the one or more debris catchers are configured to transition between a first configuration in which the debris catchers are configured to receive the piece of debris from the end effector, and a second configuration in which the debris catchers are positioned with respect to the end effector to substantially avoid interference with movement of the end effector relative to the prismatic joint.

B38. The portable work module of any of paragraphs B1-B37, further comprising a drive mechanism configured to drive the end effector and install a component within the confined space.

B38.1. The portable work module of paragraph B38, wherein the drive mechanism comprises a ratchet.

B39. The portable work module of paragraph B38 or B38.1, wherein the prismatic joint comprises a/the telescoping arm, and wherein the drive mechanism is configured to be selectively translated relative to the telescoping arm, thereby selectively translating the end effector relative to the telescoping arm.

B40. The portable work module of any of paragraphs B1-B39, wherein the end effector is configured to be selectively removeable from the portable work module and configured to be selectively replaced with a different respective end effector.

B41. The portable work module of any of paragraphs B1-B40, wherein the end effector is configured to perform the one or more tasks within a wing cavity of an aircraft wing.

C1. A portable programmable work machine, comprising the portable work module of any of paragraphs B1-41, wherein the portable programmable work machine is configured to move the portable work module at least partially into the confined space to perform one or more tasks within the confined space.

C2. The portable programmable work machine of paragraph C1, further comprising: a base supporting the prismatic joint, wherein the prismatic joint comprises a proximal end region and a distal end region opposite the proximal end region, wherein the base supports the proximal end region, and wherein the distal end region is configured to translate and rotate with respect to the base.

C3. The portable programmable work machine of paragraph C2, wherein the prismatic joint is coupled to the base within the proximal end region.

C4. The portable programmable work machine of any of paragraphs C1-C3, wherein the distal end region of the telescoping arm is configured to position and orient an end effector for performing the one or more tasks within the confined space.

C5. The portable programmable work machine of any of paragraphs C1-C4, wherein the portable programmable work machine is configured to perform the one or more tasks within the confined space autonomously or semi-autonomously.

C6. The portable programmable work machine of any of paragraphs C1-C5, further comprising a rechargeable battery, a power source, and/or a programmable computer configured to power and/or control movements of the prismatic joint and/or a/the wrist integrated with the prismatic joint.

C7. The portable programmable work machine of any of paragraphs C1-C6, wherein the base is portable with respect to the access port of the confined space.

C8. The portable programmable work machine of any of paragraphs C1-C7, wherein the portable programmable work machine comprises a moveable arm support configured to support and move the portable work module with respect to the base.

C9. The portable programmable work machine of paragraph C8, further comprising a fixed arm support configured to support the moveable arm support and couple the moveable arm support to the base.

D1. A system, comprising:
the programmable work machine of any of paragraphs C1-C9.

D2. The system of paragraph D1, further comprising a plurality of end effectors, each end effector of the plurality of end effectors being configured to be coupled to the portable work module of the programmable work machine.

D3. The system of paragraph D2, wherein each end effector of the plurality of end effectors is configured to be coupled to the prismatic joint of the portable work module, within the distal end region of the prismatic joint.

D4. The system of any of paragraphs D2-D3, wherein the plurality of end effectors are configured to be modular and interchangeable such that each respective end effector of the plurality of end effectors is configured to be selectively removed from the programmable work machine and configured to be selectively replaced by a different respective end effector of the plurality of end effectors.

D5. The system of any of paragraphs D2-D4, wherein each respective end effector of the plurality of end effectors comprises one or more of the following: swage guns, cleaning tools, sealant tools, nut driving tools, drills, grippers, installation tools, coating or painting tools, welding tools, camera or vision tools, sensors, and material removal tools.

D6. The system of any of paragraphs D1-D5, further comprising a plurality of end effectors, wherein the programmable work machine is configured such that each respective end effector is configured to be selectively removed from the programmable work machine, and wherein each respective end effector of the plurality of end effectors is configured to be selectively coupled to the programmable work machine.

D7. The system of paragraph D6, wherein each respective end effector of the plurality of end effectors is a respective portable work module of any of paragraphs B1-B41.

E1. A method, comprising:
providing the portable work module of any of paragraphs B1-B41; and
performing one or more tasks within the confined space using the end effector of the portable work module.

E1.1. The method of paragraph E1, wherein the performing the one or more tasks comprises performing a given task a plurality of times within the confined space.

E1.2. The method of paragraph E1 or E1.1, wherein the performing the one or more tasks comprises performing a plurality of different tasks within the confined space.

E2. The method of any of paragraphs E1-E1.2, further comprising coupling the portable work module to a portable programmable work machine, wherein the portable programmable work machine is configured to move the portable work module at least partially into the confined space to perform one or more tasks within the confined space.

E3. The method of paragraph E2, wherein the portable programmable work machine is the portable programmable work machine of any of paragraphs C1-C9.

E4. The method of any of paragraphs E1-E3, wherein the performing one or more tasks within the confined space comprises swaging, cleaning, applying sealants, paints, or other coatings, driving nuts or other components, moving and/or removing objects, gripping, installing one or more fasteners or other components, welding, sensing, monitoring, and/or vision-related tasks.

E5. The method of any of paragraphs E1-E4, wherein the confined space is part of an aircraft.

E6. The method of any of paragraphs E1-E5, wherein the confined space is a wing cavity of an aircraft wing.

E7. The method of any of paragraphs E1-E6, further comprising securing an/the insert of the portable work module with respect to an/the access port of a/the confined space.

E8. The method of paragraph E7, wherein the securing the insert with respect to the access port comprises activating one or more locking cylinders and one or more associated locator locks.

E9. The method of any of paragraphs E1-E8, further comprising inserting an/the insert of the portable work module at least partially into an/the access port of a/the confined space.

E10. The method of any of paragraphs E1-E9, further comprising calculating a desired position of the end effector of the portable work module with respect to a/the confined space, based on a reference location defined by an/the access port of the confined space.

E10.1. The method of paragraph E10, further comprising moving, articulating, translating, rotating, and/or pivoting the end effector to the desired position, via a/the wrist of the portable work module and/or via the prismatic joint of the portable work module, wherein the prismatic joint comprises a telescoping arm.

E10.2. The method of paragraph E10.1, wherein the wrist comprises a plurality of revolute joints.

E10.3. The method of paragraph E10.1 or E10.2, wherein the wrist comprises one or more prismatic joints.

E11. The method of any of paragraphs E1-E10.3, further comprising calculating a position of a/the target site within a/the confined space, based on a reference location defined by an/the access port of the confined space.

E12. The method of any of paragraphs E1-E11, further comprising retracting the prismatic joint of the portable work module to a compacted configuration for insertion at least partially into a/the confined space.

E13. The method of any of paragraphs E1-E12, further comprising extending a/the distal end region of the prismatic joint of the portable work module away from an/the insert of the portable work module, to position the end effector at a/the target site within a/the confined space.

E14. The method of any of paragraphs E1-E13, further comprising rotating the prismatic joint of the portable work module with respect to an/the insert of the portable work module.

E15. The method of any of paragraphs E1-E14, further comprising using a/the vision system to locate a/the target site within a/the confined space and/or to inspect the target site after the performing the one or more tasks at the target site within the confined space.

E16. The method of any of paragraphs E1-E15, wherein the performing one or more tasks comprises installing a first fastener within the confined space.

E17. The method of paragraph E16, wherein the installing the first fastener within the confined space comprises retaining a piece of debris within the end effector after the installing the first fastener, wherein the piece of debris breaks off from the first fastener during the installing the first fastener.

E18. The method of paragraph E17, further comprising removing the piece of debris from the end effector and capturing the piece of debris in the portable work module.

E19. The method of paragraph E18, further comprising loading a subsequent fastener into the end effector after the installing the first fastener, wherein the removing the piece of debris from the end effector is performed substantially simultaneously with the loading the subsequent fastener.

E20. The method of any of paragraphs E1-E19, further comprising:
retracting the prismatic joint of the portable work module to a/the compacted configuration; and
removing an/the insert of the portable work module from an/the access port of the confined space, wherein the retracting the prismatic joint is performed after the performing the one or more tasks within the confined space.

E21. The method of paragraph E20, wherein the removing the insert from the access port comprises deactivating one or more locking cylinders of the portable work module.

E22. The method of any of paragraphs E1-E21, further comprising transitioning the end effector of the portable work module between a fastener reload configuration, in which the end effector loads a subsequent fastener into the end effector, and a fastener processing configuration, in which the end effector processes the subsequent fastener within the confined space.

E23. The method of paragraph E22, further comprising moving one or more debris catchers of the end effector into a position to receive a/the piece of debris from the end effector when the end effector is in the fastener reload configuration.

E24. The method of any of paragraphs E1-E23, wherein the performing the task comprises driving the end effector via a/the drive mechanism of the portable work module.

E25. The method of paragraph E24, further comprising translating and/or pivoting the drive mechanism with respect to the prismatic joint of the portable work module.

F1. A robotic end effector configured to perform a task within a confined space, wherein each performance of the task creates a piece of debris, the robotic end effector comprising:
a debris retention structure configured to retain the piece of debris within the robotic end effector subsequent to each performance of the task by the robotic end effector;
a debris catcher configured to receive the piece of debris from the debris retention structure after each performance of the task; and
an actuation mechanism configured to selectively move the piece of debris from the debris retention structure to the debris catcher after each performance of the task.

F2. The robotic end effector of paragraph F1, wherein the debris catcher is configured to retain the piece of debris until removal of the robotic end effector from the confined space, thereby removing the piece of debris from the confined space.

F3. The robotic end effector of any of paragraphs F1-F2, wherein the actuation mechanism is further configured to position a respective fastener into the debris retention structure, substantially simultaneously with moving each respective piece of debris into the debris catcher.

F4. The robotic end effector of paragraph F3, wherein the fastener comprises a frangible nut, wherein the robotic end effector is configured to install a plurality of frangible nuts within the confined space, wherein each respective installation of a respective frangible nut creates a piece of debris that comprises a collar portion that separates from the frangible nut during installation, wherein the debris retention structure is configured to retain the collar portion after each respective installation of a respective frangible nut, and wherein the actuation mechanism is configured to position a new respective frangible nut into the debris retention structure after each installation while substantially simultaneously moving the collar portion from the previous installation into the debris catcher.

F5. The robotic end effector of any of paragraphs F1-F4, wherein the robotic end effector is configured to install a plurality of frangible fasteners, one at a time, within the confined space, wherein each respective installation of a respective frangible fastener creates a respective piece of debris, and wherein the robotic end effector further comprises a nut cartridge configured to store the plurality of frangible fasteners until each respective frangible fastener is installed within the confined space.

F6. The robotic end effector of any of paragraphs F1-F5, further comprising a drive mechanism configured to drive and install a/the frangible fastener within the confined space, wherein the drive mechanism is configured to selectively translate the debris retention structure.

F7. The robotic end effector of any of paragraphs F1-F6, in combination with a work module, the work module comprising:

a prismatic joint, wherein the prismatic joint comprises a telescoping arm that is configured to extend and retract within the confined space;

a plurality of revolute joints integrated with the telescoping arm, wherein the prismatic joint and the plurality of revolute joints are configured to articulate and position the robotic end effector within the confined space in order to perform the one or more tasks within the confined space, wherein the robotic end effector is coupled within a distal end region of the telescoping arm, wherein the distal end region is configured to extend and retract with respect to an opposite proximal end region of the telescoping arm, thereby transitioning the telescoping arm between an extended configuration and a retracted configuration, respectively; and an insert that is configured to be selectively secured with respect to an access port of the confined space while the robotic end effector performs one or more tasks within the confined space, wherein the insert is configured to remain substantially stationary with respect to the access port while the insert is secured with respect to the access port, wherein the telescoping arm is configured to be rotated and translated with respect to the insert, and wherein the robotic end effector is configured to utilize the access port as a reference location for determining positions within the confined space.

F8. The robotic end effector of paragraph F7, wherein the plurality of revolute joints comprises a wrist, and wherein the wrist is configured to adjust the roll, pitch, and yaw of the robotic end effector with respect to the telescoping arm, and wherein the wrist comprises the one or more additional prismatic joints.

F9. The robotic end effector of any of paragraphs F1-F8, in combination with the portable programmable machine of any of paragraphs A1-A16 or any of paragraphs C1-C9.

F10. The robotic end effector of any of paragraphs F1-F9, in combination with the portable work module of any of paragraphs B1-B41.

F11. The robotic end effector of any of paragraphs F1-F10, wherein the robotic end effector is configured to maintain a respective orientation while the robotic end effector is moved and positioned within the confined space via the telescoping arm.

F12. The robotic end effector of any of paragraphs F1-F11, wherein an/the insert associated with the robotic end effector comprises one or more engagement features that are configured to substantially prevent movement of the insert with respect to the access port when the insert is engaged with respect to the access port.

F13. The robotic end effector of any of paragraphs F1-F12, wherein the robotic end effector is configured to perform a plurality of tasks within the confined space, wherein each respective task of the plurality of tasks is performed in a different respective target site of the confined space, wherein the robotic end effector further comprises a vision system configured to inspect each respective target site within the confined space after a task is performed at the target site, wherein the vision system is further configured to locate each respective target site within the confined space, and wherein the vision system comprises one or more cameras configured to be extended and retracted with respect to the robotic end effector.

G1. The use of the portable programmable machine of any of paragraphs A1-A16 or any of paragraphs C1-C9 to perform one or more tasks within a confined space.

G2. The use of the portable work module of any of paragraphs B1-B41 to perform one or more tasks within a confined space.

G3. The use of the robotic end effector of any of paragraphs F1-F13 to perform one or more tasks within a confined space.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A portable programmable machine configured to perform one or more tasks within a confined space, the portable programmable machine comprising:
    a prismatic joint comprising a telescoping arm;
    a base configured to support the telescoping arm, a distal end region of the telescoping arm being unsupported by the base and having an articulating wrist configured to hold and manipulate a tool for performing the one or more tasks within the confined space, wherein the distal end region of the telescoping arm is configured to be translated with respect to the base, wherein the wrist comprises a plurality of joints configured to rotate and translate the tool with respect to the telescoping arm;
    a revolute joint configured to rotate the telescoping arm; and
    a vision system configured to facilitate positioning of the tool and performance of the one or more tasks within the confined space;
    wherein the portable programmable machine is configured to position the tool and perform the task at least one of autonomously and semi-autonomously via selectively moving the telescoping arm and the wrist with respect to the base; and
    wherein the base includes a power source and a programmable computer configured to process numerical data and to communicate with and control movements of the telescoping arm and the wrist.

2. The portable programmable machine according to claim 1, wherein the revolute joint comprises a fifth revolute joint, wherein the plurality of joints of the wrist comprises:
    a first revolute joint configured to adjust a yaw of the tool with respect to the telescoping arm;
    a second revolute joint configured to adjust a pitch of the tool with respect to the telescoping arm;
    a third revolute joint configured to adjust a roll of the tool with respect to the telescoping arm; and
    a first prismatic joint configured to translate the tool with respect to the telescoping arm, and wherein the portable programmable machine comprises a fourth revolute joint configured to rotate the tool with respect to the wrist.

3. The portable programmable machine according to claim 1, wherein the combination of the prismatic joint, the revolute joint, and the plurality of joints of the wrist is configured to provide at least six degrees of freedom for articulation and movement of the tool within the confined space.

4. The portable programmable machine according to claim 1, wherein the telescoping arm extends from a proximal end region to the distal end region, wherein the proximal end region is supported by the base, and wherein the distal end region is configured to receive, articulate, and support the tool, wherein the telescoping arm is configured to extend between a compacted configuration having a first length, and an extended configuration having a second length, wherein the second length is greater than the first length, wherein, in the compacted configuration, the telescoping arm has a reduced footprint and is configured to be inserted at least partially through an access port to the confined space, and wherein, in the extended configuration, the telescoping arm is configured to position the tool and perform the one or more tasks at a location within the confined space with the tool, spaced apart from the access port.

5. The portable programmable machine according to claim 4, further comprising an insert that is configured to be selectively secured with respect to the access port while the tool performs the one or more tasks within the confined space, wherein the insert is configured to remain substantially stationary with respect to the access port while the insert is secured with respect to the access port, wherein the telescoping arm is configured to be rotated and translated with respect to the insert via the prismatic joint 47 and the revolute joint, and wherein the portable programmable machine is configured to utilize the access port as a reference location for determining positions within the confined space.

6. The portable programmable machine according to claim 1, further comprising an air cylinder configured to provide extra extension of wrist with respect to telescoping arm.

7. The portable programmable machine of claim 1, wherein the tool includes a robotic end effector configured to perform a task within the confined space, wherein each performance of the task creates a piece of debris, wherein the robotic end effector includes:
    a debris retention structure configured to retain the piece of debris within the robotic end effector subsequent to each performance of the task by the robotic end effector;
    a debris catcher configured to receive the piece of debris from the debris retention structure after each performance of the task; and
    an actuation mechanism configured to selectively move the piece of debris from the debris retention structure to the debris catcher after each performance of the task.

8. The portable programmable machine of claim 7, wherein the debris catcher is configured to retain the piece of debris until removal of the robotic end effector from the confined space, thereby removing the piece of debris from the confined space.

9. The portable programmable machine of claim 8, wherein the actuation mechanism is further configured to position a respective fastener into the debris retention structure, substantially simultaneously with moving each respective piece of debris into the debris catcher.

10. The portable programmable machine of claim 9, wherein the fastener comprises a frangible nut, wherein the robotic end effector is configured to install a plurality of frangible nuts within the confined space, wherein each respective installation of a respective frangible nut creates a piece of debris that comprises a collar portion that separates from the frangible nut during installation, wherein the debris retention structure is configured to retain the collar portion after each respective installation of a respective frangible nut, and wherein the actuation mechanism is configured to position a new respective frangible nut into the debris retention structure after each installation while substantially simultaneously moving the collar portion from a previous installation into the debris catcher.

11. The portable programmable machine of claim 7, wherein the robotic end effector is configured to install a plurality of frangible fasteners, one at a time, within the confined space, wherein each respective installation of a respective frangible fastener creates a respective piece of debris, and wherein the robotic end effector further comprises a nut cartridge configured to store the plurality of frangible fasteners until each respective frangible fastener is installed within the confined space.

12. The portable programmable machine of claim 7, further comprising a drive mechanism configured to drive and install a frangible fastener within the confined space, wherein the drive mechanism is configured to selectively translate the debris retention structure.

13. The portable programmable machine of claim 7, in combination with a work module, the work module comprising:
 a plurality of revolute joints integrated with the telescoping arm, wherein the prismatic joint and the plurality of revolute joints are configured to articulate and position the robotic end effector within the confined space in order to perform the task within the confined space, wherein the robotic end effector is coupled within a distal end region of the telescoping arm, wherein the distal end region is configured to extend and retract with respect to an opposite proximal end region of the telescoping arm, thereby transitioning the telescoping arm between an extended configuration and a retracted configuration, respectively; and
 an insert that is configured to be selectively secured with respect to an access port of the confined space while the robotic end effector performs the task within the confined space, wherein the insert is configured to remain substantially stationary with respect to the access port while the insert is secured with respect to the access port, wherein the telescoping arm is configured to be rotated and translated with respect to the insert, and wherein the robotic end effector is configured to utilize the access port as a reference location for determining positions within the confined space.

14. The portable programmable machine of claim 13, wherein the robotic end effector is configured to maintain a respective orientation while the robotic end effector is moved and positioned within the confined space via the telescoping arm.

15. The portable programmable machine of claim 13, wherein the insert comprises one or more engagement features that are configured to substantially prevent movement of the insert with respect to the access port when the insert is engaged with respect to the access port.

16. The portable programmable machine of claim 13, wherein the robotic end effector is configured to perform a plurality of tasks within the confined space, wherein each respective task of the plurality of tasks is performed in a different respective target site of the confined space, wherein the robotic end effector further comprises a vision system configured to inspect each respective target site within the confined space after the task is performed at the target site, wherein the vision system is further configured to locate each respective target site within the confined space, and wherein the vision system comprises one or more cameras.

17. The portable programmable machine of claim 13, wherein the plurality of revolute joints comprises a wrist, and wherein the wrist is configured to adjust the roll, pitch, and yaw of the robotic end effector with respect to the telescoping arm, and wherein the wrist comprises one or more additional prismatic joints.

18. A method of utilizing the portable programmable machine of claim 13, the method comprising:
 securing the insert of the programmable work machine with respect to the access port of the confined space;
 calculating a desired position of the robotic end effector within the confined space, wherein the robotic end effector is coupled to the programmable work machine, wherein the calculating the desired position is based on a reference location defined by the access port of the confined space;
 moving the robotic end effector to the desired position within the confined space while the insert remains secured with respect to the access port; and
 performing one or more tasks within the confined space using the robotic end effector, wherein the performing the one or more tasks comprises performing a given task a plurality of times within the confined space at a plurality of respective desired positions.

19. The method according to claim 18, wherein the confined space is a wing cavity of an aircraft wing.

20. The method according to claim 18, further comprising:
 retracting the telescoping arm of the programmable work machine to a retracted configuration;
 inserting the insert at least partially into the access port of the confined space;
 extending the distal end region of the telescoping arm away from the insert of the programmable work machine, to position the robotic end effector within the confined space;
 rotating the telescoping arm with respect to the insert of the programmable work machine;
 again retracting the telescoping arm of the robotic end effector to the retracted configuration; and
 removing the insert from the access port, thereby removing the robotic end effector from the confined space.

21. The method according to claim 18, wherein the performing one or more tasks comprises:
 installing a first fastener within the confined space;
 retaining the piece of debris within the debris retention structure of the robotic end effector after the installing the first fastener, wherein the piece of debris breaks off from the first fastener during the installing the first fastener;
 removing the piece of debris from the debris retention structure and capturing the piece of debris in the debris catcher of the robotic end effector; and
 loading a subsequent fastener into the debris retention structure after the installing the first fastener, wherein the removing the piece of debris from the debris retention structure is performed substantially simultaneously with the loading the subsequent fastener.

\* \* \* \* \*